(12) United States Patent
Rezgui

(10) Patent No.: US 11,256,851 B2
(45) Date of Patent: Feb. 22, 2022

(54) AUTOMATIC GENERATION OF DOCUMENTARY CONTENT

(71) Applicant: AZ, LLC, San Francisco, CA (US)

(72) Inventor: Sana Rezgui, San Francisco, CA (US)

(73) Assignee: AZ, LLC, San Francisco, CA (US)

( * ) Notice: Subject to any disclaimer, the term of this patent is extended or adjusted under 35 U.S.C. 154(b) by 0 days.

(21) Appl. No.: 16/181,158

(22) Filed: Nov. 5, 2018

(65) Prior Publication Data

US 2019/0073343 A1    Mar. 7, 2019

Related U.S. Application Data

(63) Continuation of application No. 15/449,789, filed on Mar. 3, 2017, now Pat. No. 10,152,462.
(Continued)

(51) Int. Cl.
*G06F 40/137* (2020.01)
*G06F 40/103* (2020.01)
(Continued)

(52) U.S. Cl.
CPC .......... *G06F 40/137* (2020.01); *G06F 40/103* (2020.01); *G06F 40/123* (2020.01); *G06F 40/146* (2020.01)

(58) Field of Classification Search
CPC ............. G06F 17/30056; G06F 17/211; G06F 17/218; G06F 17/2264; G06F 17/24;
(Continued)

(56) References Cited

U.S. PATENT DOCUMENTS 5,708,825 A    1/1998 Sotomayor
5,905,654 A    5/1999 Tanino et al.
(Continued)

OTHER PUBLICATIONS

Notice of Allowance dated Nov. 2, 2020 in U.S. Appl. No. 15/818,580, 7 pages.
(Continued)

*Primary Examiner* — Wilson W Tsui
(74) *Attorney, Agent, or Firm* — Shook, Hardy & Bacon L.L.P.

(57) ABSTRACT

Embodiments are directed towards generating an interactive target document based on a static source document. The source document may be a textbook. An interactive, animated, multi-dimensional, and/or multi-layered target document is generated that documents the source document. The target document may include accompanying audio that includes speech in virtually any natural language, independent of the native language of the source document. The target document may be a presentation document (e.g. a slide deck), a video document (e.g. a movie), a report, a desktop application, a mobile application, a word processing document, a web page, an e-book, a spreadsheet, or the like. The target document may be generated automatically to document, expand upon, and provide a greater context and interpretation of the contents of the source document (i.e. the source document contents or simply the source contents). Thus, the target document may be a documentary of the source document.

20 Claims, 15 Drawing Sheets

Related U.S. Application Data

(60) Provisional application No. 62/425,011, filed on Nov. 21, 2016, provisional application No. 62/305,437, filed on Mar. 8, 2016.

(51) Int. Cl.
  *G06F 40/123* (2020.01)
  *G06F 40/146* (2020.01)

(58) Field of Classification Search
  CPC ........... G06F 17/2785; G06F 17/30554; G06F 17/30905; G06F 40/137; G06F 40/123; G06F 40/146; G06F 40/103; G06T 17/2264; G06T 13/00; G06T 11/60; G06T 13/80
  See application file for complete search history.

(56) References Cited

U.S. PATENT DOCUMENTS

| | | | |
|---|---|---|---|
| 7,117,453 | B2 | 10/2006 | Drucker et al. |
| 8,065,606 | B1 * | 11/2011 | Gralnick ............... G06F 40/123 |
| | | | 715/234 |
| 8,810,583 | B2 | 8/2014 | Kang et al. |
| 9,026,915 | B1 | 5/2015 | Ehlen et al. |
| 2001/0032248 | A1 | 10/2001 | Krafchin |
| 2001/0049596 | A1 | 12/2001 | Lavine et al. |
| 2002/0156803 | A1 * | 10/2002 | Maslov ................. G06F 40/154 |
| | | | 715/234 |
| 2002/0184267 | A1 * | 12/2002 | Nakao .................. G06F 16/345 |
| | | | 715/255 |
| 2003/0208502 | A1 | 11/2003 | Lin |
| 2003/0217330 | A1 | 11/2003 | Shelley |
| 2006/0197764 | A1 | 9/2006 | Yang |
| 2006/0217979 | A1 | 9/2006 | Pahud et al. |
| 2007/0094251 | A1 | 4/2007 | Lu et al. |
| 2008/0172616 | A1 * | 7/2008 | Harrington ............ G06F 16/34 |
| | | | 715/727 |
| 2009/0113289 | A1 * | 4/2009 | Zhang .................... G06F 16/16 |
| | | | 715/239 |
| 2009/0150364 | A1 * | 6/2009 | Melander ............. G06F 16/345 |
| 2013/0205202 | A1 | 8/2013 | Xiao et al. |
| 2014/0013192 | A1 | 1/2014 | McQuiggan et al. |
| 2014/0282324 | A1 | 9/2014 | Greiner et al. |
| 2015/0033116 | A1 | 1/2015 | McKinney et al. |
| 2015/0134600 | A1 | 5/2015 | Eisner et al. |
| 2016/0277715 | A1 | 9/2016 | Mankovskii et al. |

OTHER PUBLICATIONS

Cirulis, A. et al., "Visualization Techniques for Simulation Models in Virtual Reality", Proceedings of the European Modeling and Simulation Symposium, pp. 6 (2014).

Non-Final Office Action dated Mar. 20, 2020 in U.S. Appl. No. 15/818,580, 8 pages.

* cited by examiner

FIG. 4B (440)

| Slice | 1 | 2 | ... | N |
|---|---|---|---|---|
| Type | | | | |
| Title | | | | |
| Length | | | | |
| Index Character | Start | | | |
| | End | | | |
| Indexes of Local / Global Supporting Docs | Database | | | |
| | Dictionary | | | |
| | Library | | | |
| Rank | | | | |
| Level | | | | |
| Priority | | | | |
| Weight | | | | |
| Etc. | | | | |

FIG. 4C (460)

| Sub-Slice | 1 | 2 | ... | N |
|---|---|---|---|---|
| Type | | | | |
| Title | | | | |
| Length | | | | |
| Index Character | Start | | | |
| | End | | | |
| Indexes of Local / Global Supporting Docs | Database | | | |
| | Dictionary | | | |
| | Library | | | |
| Rank | | | | |
| Level | | | | |
| Priority | | | | |
| Weight | | | | |
| Item | | | | |
| Legend | | | | |
| Explicative Text | Start | | | |
| | End | | | |
| References | | | | |
| Appendixes | | | | |
| Weblinks | | | | |
| -Summarize Headlines | | | | |
| -Slide Notes | | | | |
| -Teleprompter | | | | |

| Slice | | 1 | 2 | ... | N |
|---|---|---|---|---|---|
| Type | | | | | |
| Title | | | | | |
| Length | | | | | |
| Index Character | Start | | | | |
| | End | | | | |
| Indexes of Local / Global Supporting Docs | Database | | | | |
| | Dictionary | | | | |
| | Library | | | | |
| Rank | | | | | |
| Level | | | | | |
| Priority | | | | | |
| Weight | | | | | |
| *Sub-Slice Table | | | | | |
| Etc. | | | | | |

AUTOMATIC GENERATION OF DOCUMENTARY CONTENT

CROSS-REFERENCE TO RELATED APPLICATIONS

This application is a Continuation of U.S. patent application Ser. No. 15/449,789 filed Mar. 3, 2017 and entitled "AUTOMATIC GENERATION OF DOCUMENTARY CONTENT," which claims priority to U.S. Provisional Application No. 62/305,437, filed Mar. 8, 2016 and entitled "METHODS AND SYSTEMS FOR THE AUTOMATIC RECOGNITION, INTERPRETATION, AND TRANSFORMATION OF CONTENT," and U.S. Provisional Application No. 62/425,011, filed Nov. 21, 2016 and entitled "METHODS AND SYSTEMS FOR THE AUTOMATIC VIRTUAL AUGMENTED REALITY GRAPHIC DISPLAY OF AN ENTITY," the entire contents of the aforementioned applications are herein incorporated by reference.

BACKGROUND

The use of web interactive tools is steadily growing in education, scientific research, and other fields of development. Such efforts have been strengthened by automation in data acquisition, and processing. However, the educational, scientific, and marketing materials, such as textbooks, datasheets, and the like, generated via such efforts generally lack automation and processing of their contents. Indeed, many web tools remained at the edge of their contents and may not provide a greater context than the contents. Furthermore, such tools and web-based resources remain text-based, or when present, their multi-media components are limited in scope. It is for these and other reasons that the following disclosure is provided.

SUMMARY

Embodiments are directed towards generating an interactive target document based on a static source document. The source document may be a textbook. An interactive, animated, multi-dimensional, and/or multi-layered target document is generated that documents the source document. The target document may include accompanying audio that includes speech in virtually any natural language, independent of the native language of the source document. The target document may be a presentation document (e.g. a slide deck), a video document (e.g. a movie), a report, a desktop application, a mobile application, a word processing document, a web page, an e-book, a spreadsheet, or the like. The target document may be generated automatically to document, expand upon, and provide a greater context and interpretation of the contents of the source document (i.e. the source document contents or simply the source contents). Thus, the target document may be a documentary of the source document.

More particularly, some embodiments are directed to one or more methods for generating a documentary of a source document. The method may include receiving the source document that includes at least textual source content, determining a source document structure of the source document, and segmenting the source content into a hierarchy of slices and/or sub-slices based on the source document structure. The method may further include generating a coding map, generating one or more presentation slides for each of the slices and/or sub-slices, populating the presentation slides, and generating a target document to include at least some of the populated slides. The coding map may provide and/or include a map between at least a rank and/or a level of the hierarchical slices and/or sub-slices and a logical location of source content corresponding to the hierarchical slice. For instance, the logical local may be an index, pointer, link or some other indication of the location of the corresponding portion of the source content. Each presentation slide may be populated with at least a portion of the corresponding content. The target document may include the populated presentations slides and may be a documentary of the source content. In various embodiments, the a coding map may be referred to as a slice table, a sub-slice table, and/or a slice/sub-slice table.

In some embodiments, the method further includes receiving target document parameters, generating the coding map based on the target document parameters, and generating and/or populating the presentations slides based on the target document parameters. In at least one embodiments, a format of or for the target documents may be determined based on the target document parameters. The target document may be generated in the determined format. For instance, the format may include a target document type, such as but not limited to presentation document (e.g. a slide deck), a video document (e.g. a movie), a report, a desktop application, a mobile application, a word processing document, a web page, an e-book, a spreadsheet, or the like.

In some embodiments, the method may further include generating source code based on the populated presentation slides and generating a processor application based on the source code. For instance, the source code may be compiled into an executable mobile and/or desktop application that documents the source documents. The application may be provided to a distributed-computing system. For instance, the application may be published in an online application store. The method may generate a video presentation that includes the documentary of the source document.

In some embodiments, the method may include providing the target document to a user, receiving one or more edits from the user, updating the target document based on the edits, and providing the updated target document to the user. The method may further include generating audible narration for textual content included in the source content and updating the corresponding presentation slides to include the embedded narration. In some embodiments, the language of the source content may be translated.

In some embodiments, the coding map may be employed as another form of metadata. Accordingly, instead of opening the source document in the folder in a format source content, it could be open in another target type format. In other words, the coding map is compatible with movie and virtual reality and/or augmented reality (VR/AR) applications so they would open with them. Also, once viewing a pdf or pages doc., we can simply export to movie format (without viewing any of the intermediate steps) as we export to word or other format. You can simply open/save it from/in your folder or view it online, etc. If to be stored, the result coding map can be 1) a combination between the original metadata and the result coding map, in other words the target doc. will be native to the operating system with its own metadata or 2) an accompanying doc. to the source doc. The target document can use the cloud APIs.

A presentation slide can be a slide as a view or sub-view as in the mobile app world or the VR/AR applications. The same concept of movie creation in mobile apps applies to VR/AR applications. It is only more parameter coding with additional layers, dimensions, and angles. The concept of automation applies to all. Various multidimensional and/or multi-layered effects may be translated to VR/AR effects and/or applications.

BRIEF DESCRIPTION OF THE DRAWINGS

FIG. 4B illustrates an exemplary embodiment of coding map entry for a slice of a source document.

FIG. 4C illustrates an exemplary embodiment of coding map entry for a sub-slice of a source document.

FIG. 4D illustrates an exemplary embodiment of updated coding map entry for a slice of a source document.

DETAILED DESCRIPTION

Figure 1:
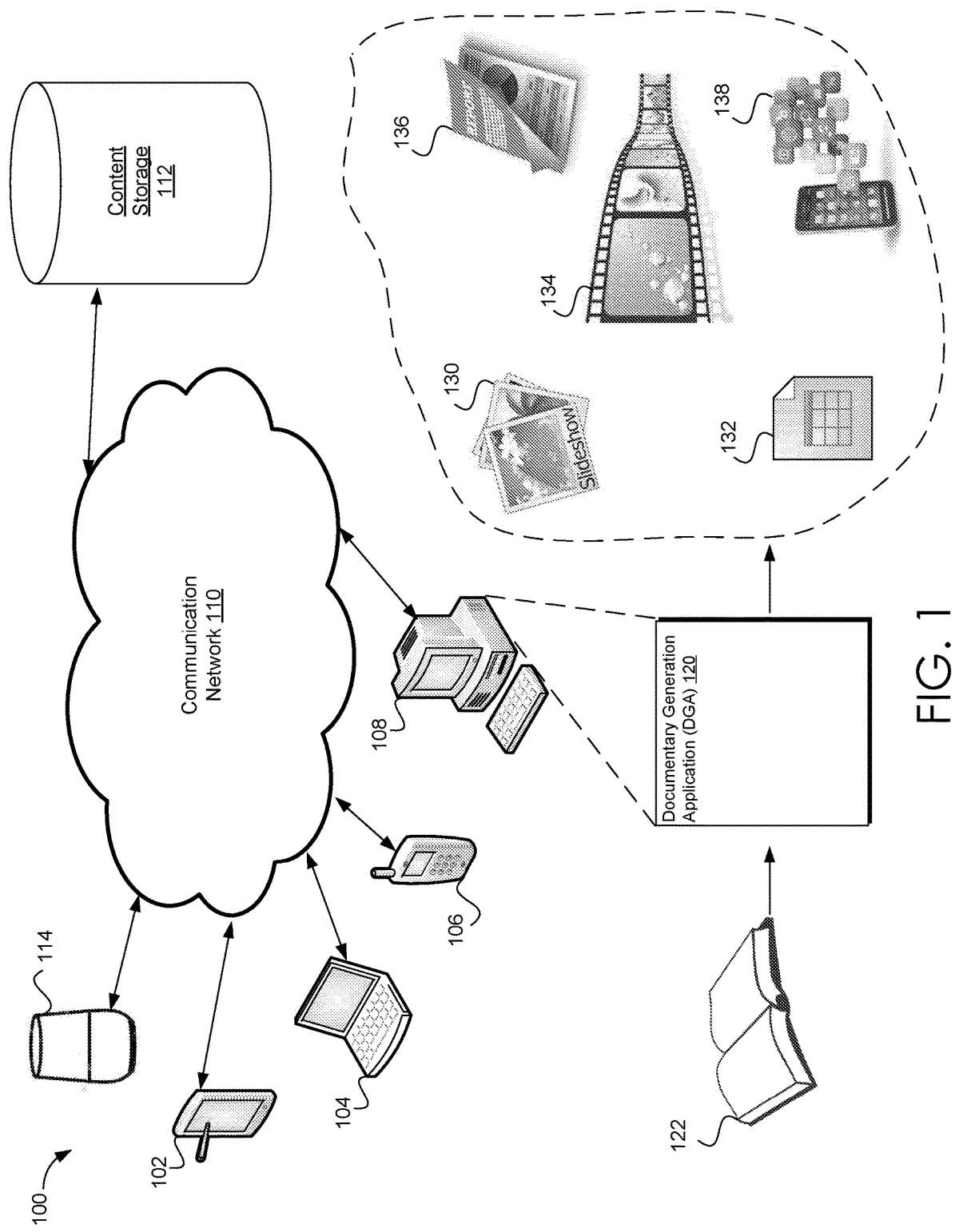
FIG. 1 illustrates an exemplary embodiment of a documentary generation system that is consistent with the various embodiments presented herein.

Briefly stated, various embodiments are directed towards generating and/or synthesizing an interactive target document based on a static source document. In the various embodiments, the source document may include but is not limited to educational material, such as a textbook. The various embodiments automatically generate a target document, based on the source document (per user instructions if requested, or default settings). The target document may be interactive, animated, multi-dimensional, and/or multi-layered. The target document may include accompanying audio that includes speech in virtually any natural language that narrates at least portions of the content of the source document. The natural language of the narration is independent of the native language of the source document. The target document may be, but is not limited to a presentation document (e.g. a slide deck), a video document (e.g. a movie), a report, a desktop application, a mobile application, a word processing document, a web page, an e-book, a spreadsheet, or the like. The application may be a local, server, or cloud-based application. The target document may be a combination of any such target document types. The target document may be generated automatically to document, expand upon, and provide a greater context and interpretation of the contents of the source document (i.e. the source document contents or simply the source contents). Thus, the target document may be a documentary (i.e. a movie/animation) of the source document.

Accordingly, the various embodiments may be employed to increase the utility existing educational platforms (e.g. a virtual teacher or instructor). Furthermore, the various embodiments may enable novel platforms for scientific/engineering research and other development fields by automating the documenting of the work and the results of such endeavors. The various embodiments enable the aggregation, summation, and/or insightful interpretation of complex subjects. The various embodiments may provide simplified summary of highly technical and detailed subject matter. A user may be provided with insightful comprehension of the source content, via the interaction target document. Because the target document may include spoken language, animation, and other visual materials, the consumption of the target document may be less tedious and more correlating with the user's needs and current level of comprehension, than the original source document.

The various embodiments provide a powerful educational tool. For instance, static textbooks may be employed as a source document. The resulting target document may include an interactive game between teacher-student, an exam-preparation, a marketing/sales tool to advertise existing or new products (datasheets, application specifications), and the like. The various embodiments may be employed in broad applications.

Previously available tools have often lacked interactivity with the user and have limited success with scientific and/or technical books. For instance, without prior understanding of their meanings, knowledge of their content, third-party translations, or teaching support, highly technical textbooks have remained inaccessible to the common reader and required extensive learning efforts with long dedicated hours to get to their main message.

Previously available educational tools targeting technical subjects may provide assistance in comprehension of the subject via online tutorials, video streaming, and the like. Such tools may diminish the authentic relationship between the book-author and the reader. The generation of such content may not be automated. For instance, the translation of text to meaning, figures to symbols, and textual content to video content may require significant manual effort from a user and/or author. In contrast to such previously available tools, the various embodiments herein enables automated translation, explanation, consumption, comprehension, and/or interpretation of the source contents. Thus, the various embodiments facilitate the understanding of a source document in an assisted manner that decreases the user's efforts typically required to master difficult technical material.

The target document may provide a novel and meaningful representation of at least a portion of the source content, that is based on previously added attributes (organizations, orders, links, etc.). Via multi-media components, a user may interact with the content of the target document (i.e. target document content or simply target content).

The content-user relationship is mutable with the previous or current user's interactions, capabilities, familiarities and/or prior explanations. The user may control the generation of, and edit and/or update the target document via user interactions with one or more user interfaces (UIs). Although some embodiments are directed to textbooks, other embodiments are not so limited. For instance, the source document may include virtually any text-based document, such as but not limited to a web page, a novel, e-book, magazine article, journal entry, spreadsheet, or the like.

In at least some embodiments, the source document may be directed to an integrated circuit (IC). The target document may be and/or provide a multi-layered and/or multi-dimensional document of various aspects of the IC. The target document may enable a user to interact with functionalities of the IC. For instance, the target document may be employed to simulate various functionalities of the IC. Thus, the target document may provide and/or enable a virtualized IC. Within the virtualized IC, the IC may be viewed on several superposed layers (process, device, design, architecture, compiler, documentation, testing, simulation, reliability, qualification, radiation tolerance, marketing, sales, etc.) and can be layered if desired by the user.

In an exemplary, but not non-limiting embodiment, the source document may include a figure that is directed towards the IC. When generating the corresponding target document, sub-slices for the figure may be determined. For instance, the sub-slices could include a set of transistors, diodes, resistors, op-amps, etc. These sub-slices may be encoded and/or accessed via the coding table. The combination of these identified sub-slices and the explicative text will result in a set of animation gestures that will accompany the item throughout the document/slice/sub-slice processing.

Exemplary Image Generation System

FIG. 1 illustrates an exemplary embodiment of a documentary generation system 100 that is consistent with the various embodiments presented herein. System 100 includes one or more computing devices, such as but not limited to mobile device 102, laptop 104, smartphone 106, desktop computing device 108, virtual-assistant (VA) device 114, and the like. VA device 114 may be a virtual teacher. Other embodiments may include more or less computing devices. Various embodiments of computing devices are discussed in conjunction with at least FIG. 7. The computing devices may be communicatively coupled via a wired and/or wireless communication network 110.

System 100 may also include content storage 112. Content storage 112 may store source documents, as well as automatically generated target documents. Content storage 112 may be communicatively coupled to at least one of the computing devices, via communication network 110. As discussed herein, only the coding map (a few kbytes) and the source document (may exceed gigabytes) need to be stored. For instance, each time a user would like to view a movie, the movie-type target document may be re-generated in real time, without the requirement of storing the target document for later consumption. In some embodiments, slides within the target document may be generated on demand (and in real time) when the user indicated via a user selection to advance to the next slide.

The user may indicate to not to save the coding map. For instance, coding map may be re-generated for the generation of subsequent target documents. Essentially, and in contrast to previously available systems, the coding map provides a representation of the organization of the source content, including any associated metadata. Communication network 110 may be any communication network, including virtually any wired and or wireless communication technologies, wired and/or wireless communication protocols, and the like. It should be understood that communication network 110 may be virtually any communication network that communicatively couples a plurality of computing devices and databases in such a way as to enable users of computing devices to exchange information via the computing devices.

One of the computing devices may host a documentary generation application (DGA) 120. Although FIG. 1 shows desktop computing device 108 hosting DGA 120, other embodiments are not so limited. For instance, virtually any other computing device, such as but not limited to tablet 102 may host DGA 120. In other embodiments, a client/server architecture may be employed. Various embodiments of a DGA, such as but not limited to DGA 120 are discussed in conjunction with at least FIG. 2. However, briefly here, DGA 120 may receive a source document 122, such as but not limited to an e-book, digitized and/or scanned textbook, a novel available via a website, or the like. Via the various embodiments described herein, DGA 120 generates one or more target documents.

The target document may be of virtually any document type, such as but not limited to slideshow (e.g. a presentation or slide deck) 130, spreadsheet 132, video document 134 (e.g. a movie or animation), a report (such as a word processing document) 136, a mobile app 138, or the like. Other target document types include, but are not limited to a web page, a hypertext file, a desktop application, an audio file, or the like.

In various embodiments, one computing device may provide another computing device (hosting DGA 120) the source document 122, via communication network 110. In other embodiments, DGA may be running locally on the computing device that provide source document 122. Source document 122 may be fetched, retrieved, or pushed from content storage 112. Similarly, content storage 112 may receive and store the generated target document, via communication network 110. VA device 114 may be employed to narrate at least portions of the target document. In some embodiments, a user may employ VA device 114 to control the generation of the target document, as well as edit, update, and interact with the target document.

In one exemplary, but non-limiting embodiment, the source document may be an engineering textbook. DGA 120 may generate a target document, such as but not limited to a presentation document (e.g. a slide deck), based on the engineering source document. Each slide of the target document may include a portion source content arranged in a format that provides a useful and present presentation of the source document to the user. Some slides may include textual content, figures, tables, figures and/or table captions, equations, or any suitable combination thereof. Narration in any user-selectable natural language may be provided with the slide.

The target content may be re-arranged such that a maximum of a single figure is included in a slide. However, in some embodiments, if two or more items (figures, tables, equations, etc.) are small enough and can fit in one slide then the multiple items will be automatically included (via the selection of a template) in a single slide based on the content (i.e. the number of words, the number of paragraphs, the number of figures, the number of captions, the title, and the like). With animation, a slice may be segmented across multiple slides to display first text, then figure, and the like.

Each slice may correspond to one slide; each slice may include the auto-layout features (via the template, which may be selected automatically or may be selected by the user at every slice), index of images to add, address of paragraphs to include, etc. In the case where animation is enabled, the layouts and sizes of slice contents (figures, text, etc.) will be changing with every new slide as more content is added at every step. If a slice is animated then it will be split in several sub-slices where each one of them can be implemented using the same or a different layout template. In some embodiments, if the textual content relating to the figure is spread across multiple slides, the figure may be re-produced for each slide. In some embodiments, the target document may be animated to generate a video or an image of the presentation.

Thus, a textbook may be automatically transformed into a narrated multi-dimensional, multi-layered video documentary that is augmented with text, weblinks, documentation, and the like. It is the superposition of several views each has various coordinates (the same or different), and can be seen simultaneously or separately. When generating a movie-type target document in real time from a source document (such as but not limited to a document encoded in a portable document format), an initial coding map may be generated. The coding map may be generated as a whole and then process/interpret/display the ensemble/part/each of the slices. If each slice is processed separately, the result documentary will be generated in real time, slide by slide. The process will be seamless to the user and no need to have storage for all generated target documents unless requested by the user. The result can be stored on the user personal server, device (desktop, laptop, mobile, etc.), cloud, and/or the tool's cloud, server, etc. The coding encodes the source document. Once the coding map is initially generated, the source document may be re-organized. The target document may be displayed slice by slice, a subset of slices or any combination thereof.

The coding map may be updated via the target document parameters. A new target document may be generated and may be a reflection of the updated coding map. In other words, the initially first generated coding map is the reflection of the source content and the initial target document parameter. After subsequent updates to the target document parameters, the updated coding map is the reflection of target document. The coding map is updateable based on updates to the target document parameters, during the viewing of the target document. The resulting updated coding map may include another representation of the organization of the source document metadata (such as but not limited to TOC).

In various embodiments, the user may select the level of details to include in the target document via target document parameters. As discussed below, in some embodiments, the source document structure is determined. In some embodiments, the user may change the levels of details to be viewed at any time during the viewing of the document, skip pages, sections, etc. In one exemplary embodiment, the user may wish the target document to include only the introductory section of each chapter of the source document. Via a selection of target document parameters corresponding to the level and the rank indexes of the source document structure, a target document may be generated that includes only the introduction section of each chapter of the source document.

The embodiments enable the automated generation of the target document scenes within the slices. These scenes are similar to the gaming scenes and can also be compatible with pre-existing ones. Currently, the user has to create these scenes manually. With the new tool, the target document scenes will be created automatically from the source contents as all of the scenes parameters can be created programmatically. The embodiments automate programmability using a similar principle of the coding map auto-layout feature, where all the scenes parameters may be stored in the coding map. These scenes may be automatically generated, rather than manually coded by the user. The scenes may be viewed from any angle as in gaming technology. Any viewing angle may be generated so the target document may be viewed in free-play mode as a movie. Also, the user can stop the movie at any time and view the scenes manually as well. The scenes can become also multi-layered and it is all programmed in the coding map based on the source content and the target document parameters.

Essentially, the coding map may encode the metadata of a multi-layered multi-dimensional and only require a few kBytes to store. A coding map includes a docID (a source document ID) and therefore is associated to a unique source document.

Furthermore, the various embodiments enable the generation of target documents beyond traditional publication of digital books, such as electronic books (i.e. ebooks). In contrast to traditional ebook publishing, the various embodiments herein enable an extraction and transformation of the content and any associated metadata that provides additional encoding of the content). The extracted metadata is organized in a coding map (i.e. a coding map). The coding map provides a representation of the original metadata of the source document. Various embodiments transform the metadata from an initial representation (included in the coding map) to another representation that encodes an interpretation for the target document, such as a movie or animation. Any transformation of the target content may be shown in the coding map. Any generation or insertion of additional content may also be encoded and included in the coding map. Accordingly, for subsequent generation of target documents based on the source document, only the coding map needs to be saved, accessed, and traversed. A coding map may require kBytes of storage, while the source document may require 100s of Mbytes. Accordingly, a significant reduction in required digital storage is achieved.

Traditional ebooks are coded documents that are generated based on clearly formatted books with a predefined table of contents (TOC). In such scenarios, the various contents of the book (TOC, figures, titles, legends, etc.) (if not provided) may be generated automatically from the book contents and formats (font size, number of words, etc.). Essentially, such traditional ebooks may be merely a digital reproduction of the original book. In contrast, the various embodiments herein provide a re-interpretation and representation of the source content. For instance, the source content may be re-organized and re-arranged in a multi-dimensional, multi-layered representation to be included in an interactive movie/animation to be presented and/or embedded in an augmented reality (AR) and/or a virtual reality (VR) environment.

A user may initially generate an animation/movie type target document. The target document will automatically be generated with animations per the user requests and selections. Similarly, cross-reference, narration and translation to other languages can also be requested initially or at any time during the generation of an initial target document generation or for the generation of subsequent target documents. The user may additionally request updates to the target document to include additional animations that are interpreted and added to source code (that generates application-type target documents) and/or the coding map. Thus, the coding map may encode multiple and varied target documents.

Exemplary Documentary Generation Application

Figure 2:
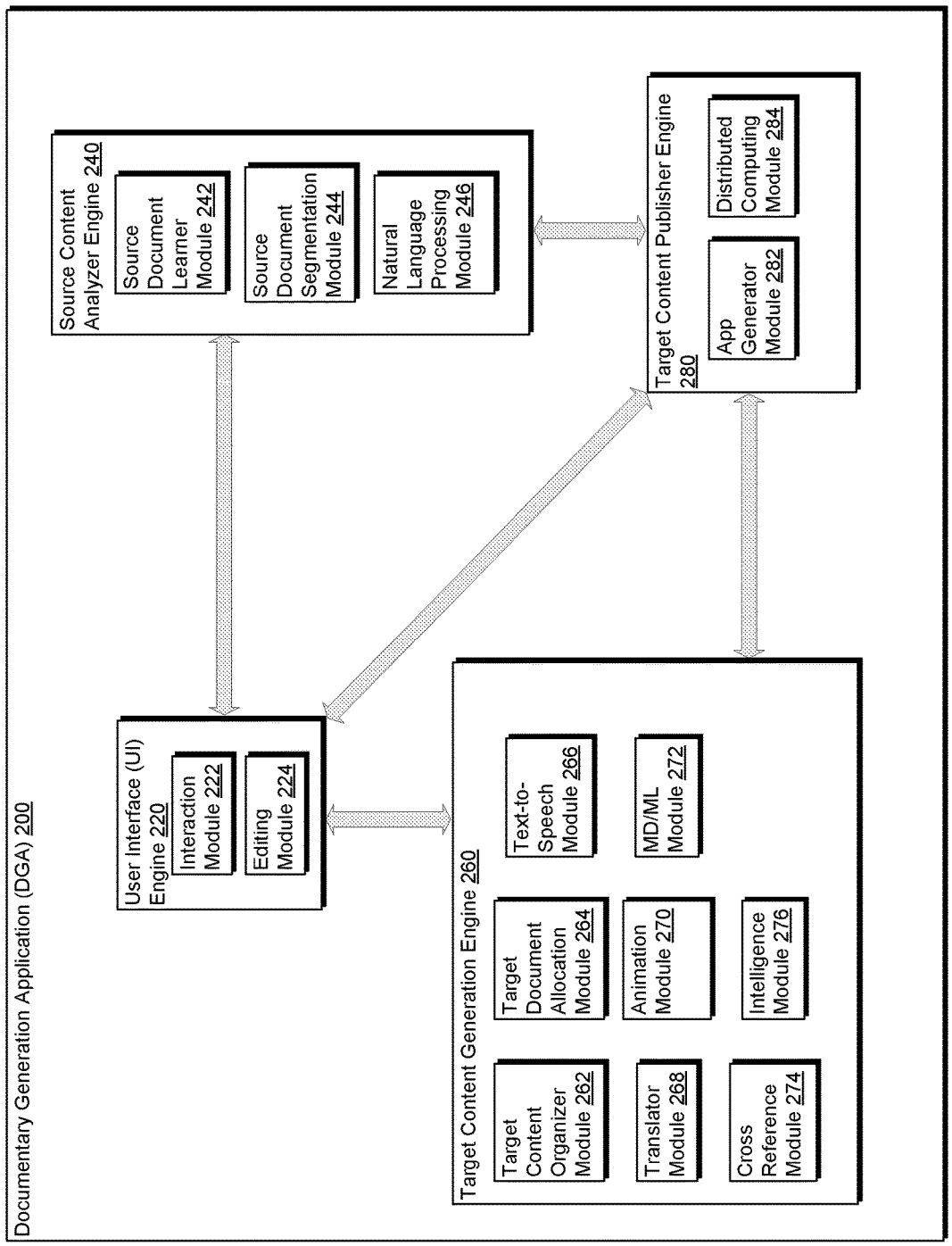
FIG. 2 illustrates an exemplary embodiment of a documentary generation application that is consistent with the various embodiments presented herein.

FIG. 2 illustrates an exemplary embodiment of a documentary generation application (DGA) 200 that is consistent with the various embodiments presented herein. DGA 120 of FIG. 1 and DGA 200 may include similar features and functionalities. As described herein, DGA 200 may automatically recognize, interpret, translate, re-organize, and/or transform a source content of a source document. Once re-interpreted and re-organized, the source content may be updated to generate target content. The re-organized and re-interpreted target content may be presented and/or provided to a user via an automatically generated target document.

The target document provides a clearer meaning per the user's understanding. The generation and/or updating of the target content may be automatic and/or interactive and may include interactive multimedia manner, such as but not limited to video content. The implementation steps are iterative per the user's request and interactive with the user's inputs. The levels of updated and/or re-organized target content's explicative details are user-selected and scaled with user-tool interactions.

DGA 200 includes user interface (UI) engine 220, source content analyzer engine 240, target content generation engine 260, and target content publisher engine 280. Various components or modules included in, or at least associated with the various engines of the DGA 200 will be discussed herein. The services provided by such modules or components may be requested by other engines, components, modules, applications, or the like. For instance, a series of application programming interfaces (APIs) may be employed to request and/or receive the services and/or functionalities of the various applications, engines, modules, components, and the like.

Any of the various engines, modules, components, applications, or the like may include one or more machine-learning components, such as deep-learning networks, convolutional/deconvolutional networks, Bayesian networks, and the like. Such components may include functionalities such as, but not limited to image recognition, speech recognition/analysis, classifiers, and the like. Such machine-learning components may be trained via supervised and/or unsupervised techniques.

UI engine 220 may include an interaction module 222 and an editing module 224. UI engine 220 provides one or more UIs that enable a user to provide a source document and control the generation of the target document. The UIs enable a user to consume and/or view the target document and interactively update and/or edit the target document.

More specifically, the UIs enable a user to provide one or more target document parameters that capture or indicate user settings or preferences for the generation and publishing of the target document. Such target document parameters may include one or more indications of the natural language of the target document, the level of hierarchical content to include in the target document, the degree of summarization/abbreviation or detail of the source content to include in the target document, the target document type, whether the target content is to be animated or static, whether to include translation and/or narration services, and the like. As discussed further below, the target document parameter may include an indication of the level and ranks of slice and/or sub-slices to employ when generating the target document.

In some embodiments, the natural language of the target documents may be determined automatically via localization.

By providing the target document parameters, a user may indicate whether to generate additional target content, via additional resources, such as search engines, scientific and/or engineering databases, online encyclopedias, links, web pages, and the like. The target document parameters may additionally indicate multi-dimensional and/or multi-layered hierarchical views to include in the target document, or any other attributes of the target document to be generated.

The target document parameters may be iteratively updated to generate multiple versions of a target document from a single source document. For instance, the multiple versions may be targeted to separate audiences of various levels of sophistication of the technical details of the source content. For instance, a first version of an application of the target document may be generated for a first operating system and a second version of the target document may be generated for a second operating system.

UI engine 220 may include an interaction module 222 and an editing module 224. The interaction module 222 may enable a user to provide a source document and receive generated target documents, select the settings initially and/or throughout the target document generation with additional settings. Furthermore, the interaction module 222 enables a user to interact with and/or view the target document. For instance, a user may interact with the target document via voice commands, touch commands, gestures, and the like. Via the interaction module 222 the user may query DGA 200 for answers to various questions regarding the content of the target document. In various embodiments, DGA 200 is enabled to search online resources or local databases and libraries to obtain and provide the answers to such questions. Interaction module 222 may enable the user to provide the one or more target document parameters. Editing module 224 enables the user to iteratively edit the target document.

Source content analyzer engine 240 enables the interpretation and transformation of the source content of the source document. Target content generation engine 260 enables the generation and updating of the target content for the target document. Target content publisher engine 280 publishes the target document. For instance, the target document may be published via a web service, an online content/application retailer (e.g. an application store), a cloud service, or the like. When the target document is to be published as a mobile and/or desktop application, the target content publisher engine 280 may generate the requisite source code to generate the application. Modules (220, 240, 260 and 280) may reside on the same application, meaning all modules may be run simultaneously or separately. For instance, the document generation can be prepared in advance (offline) while its publishing is done separately at a different time and location.

More particularly, source content analyzer engine 240 learns the structure of the source document. For instance, the source content analyzer 240 may employ a source document learner module 242 to learn the source document structure. The source document structure may be hierarchical in nature. That is the source content of the source document may be arranged in hierarchical structures, such as parts, chapters, sections, sub-sections, figures, equations, images, tables, appendixes, and the like. The source document learner module 242 may be trained to determine such a structure and learn how to intelligently segment the source content via that source document structure. The source document learner module may determine the hierarchical source document structure via an analysis of a table of contents (TOC) of the source document, an analysis of font features of the source documents, the number of words, the number of paragraphs, or the like. Such font features include, but are not limited to relative font size, sequence of found fonts taken in account the number or words or paragraphs, font style, font under/over-lining, font bold, font italicizing, and the like.

The hierarchical source document structure may be notated via one or more indexes, such as a level index (n) and a rank index (r). In one non-limiting, but exemplary embodiments, chapters of a book are assigned a level index of n=0. Likewise, sections of the source document are assigned a level index of n=1 and sub-sections are assigned a level index of n=2. Figures, tables, equations, and the like may be assigned higher levels. Accordingly, the source content may be recursively segmented via an unlimited number of levels. The first chapter may be assigned a rank index of r=0, while the second chapter is assigned a rank index of r=1.

The source document learner module 240 may be enabled to determine, detect, and/or learn such a structure of the source document. The source document learner module 240 may employ the services of a natural language processing module 246 to analyze the structure and substantive content of the source document. Source document learner module 240 may learn other structure, features, and/or properties of the source document. Such additional structures or features of the source document include, but are not limited to the author of, the natural language of, and a type (or genre) of the source content, as well as various geographic locations (or geo-coordinates) associated with the source content. By employing the natural language processing module 246, the context, subject, TOC, or the like of the source document may be determined via a natural language processing (NLP) of the source document. For instance, various keywords may be queried. The introduction section of the source document may be analyzed to determine various contexts of the source document.

The source document learner module 240 may determine various supporting documents, resources, or other sources of content associated with the source document may be determined. For instance, various APIs, dictionaries, databases, online encyclopedias, libraries, and the like may be determined. Specially coded information, such as editors, dedications, authors, and the like may be determined via the source document learner module 240. The nomenclature, acronyms, list of figures, list of tables, and the like may be determined. The source document learner module 240 may determine and/or analyze the appendixes, cited references of the source document. Once such references are identified, the module 240 may automatically link to them through the web or other locations.

The source content analyzer engine 240 may include and/or employ the services of a document segmentation module 244 to segment the source content into a plurality of slices and sub-slices. For instance, each of the determined structures of the source document structure may be included in one or more slice and/or sub-slices based on at least the level and rank indexes of the slice and/or sub-slices. A slice or a sub-slice may be a data structure that includes at least a level index, a rank index, and an address, pointer, link, or some other indication of a location of a portion of the source content.

Each element within the source content may be included in one or more slices and/or sub-slices. For instance, a figure may be included in a slice that corresponds to the associated chapter. The same figure may be included in a sub-slice that corresponds to the associated section of the chapter. Furthermore, the figure may be included in a sub-slice that corresponds specifically to the figure. Slices and sub-slices may further include sets of gestures, links, transitions, proximities to other slices/sub-slices, weights, priorities, and the like.

The display level of each slice/sub-slice may be directly linked to the requested level of explanation, while the weights and priorities allow prioritization of certain sub-slices, given their subjects, the user-selections and their links to other portions of the source document.

Each sub-slice may include item that can be a figure, a table, a formula, an equation, an image and associated captions and legends; both will be added first to the slide. A sub-slice may further include explicative textual content of the source content. Weights and priorities are determined based on text meaning (NLP), frequency and location of words & their relationships to major found titles in a document.

Once the source content is analyzed, processed, and segmented into a plurality of slices and sub-slices, the target content generation engine 260 may generate one or more target documents, based on the source content. A target content organizer module 262 may organize the segmented source content and generate corresponding target content based on the organized source content. The organization of the source content and generation of the target content may be based on the target document parameters. For instance, a user may wish to include only the level index n=0 source content in the target document. As such, the level index n=0 source content may be organized, and the corresponding target content is generated. Once a coding map has been extracted, except for the actual text processing through NLP usage, most of the reorganization and algorithmic work is done on the slice table contents, which will minimize external data accesses to external metadata and will allow optimization of the timing performance. For instance, once the relative sizes of images have been extracted and stored in the slice table, the re-layout of the slice/slide contents will be calculated using just the stored sizes of images in the coding map. That way the tool is faster as it handles only numbers and not external images.

Furthermore, a target documentation allocation module 264 may allocate locations within the target document to position, insert, or otherwise include the target content in the target document. Each identified sub-slice may be assigned a location in target document (such as a presentation document). The reorganization and reallocation steps can be prioritized per the user requests, and the sub-slices already set weights and priorities. As an example, a given sub-slice can be prioritized by the user but set to have a medium weight. If the user enforces the priority selection then the user's priority selection may be employed to override the weights assigned automatically by the various embodiments to the hiding or the re-arrangement of certain slides at the next viewing of the target document.

For instance, one or more slides within a presentation-type target document may be allocated for each slice and/or sub-slice to include in the target document. The target document allocation module 264 may determine various templates to allocate the target content within, based on the target content. For instance, a slide template may be determined based on whether the target content includes a figure, a table, an image, an equation, textual content, or the like.

The templates may be preset for long (H>W) and wide (H<W) figures with different organization schemes. Based on the slice contents, a template may be selected manually by the user or automatically by the tool. Templates can also be built automatically per the slice content, meaning that it will suggest a new layout template that was not programmed before. These templates can be randomly formed and their organizations automatically and mathematically calculated. When formed randomly, a pseudo-random or random seed values (LFSR) may be provided to a pseudo-random number generator. The first slice can use for instance a random seed value (initiated with environmental values, completely variable) and the subsequent will use an LFSR value of the randomly initially selected value. The result slides will then look completely random, making it look naturally created or quite unique as if created by a designer. The auto-layout applies to all of the slice/slide contents.

Initially, a target document may include N slides, where N is equivalent to the number of slices and/or sub-slices. The slides may be populated with titles at the top and links to references, appendixes at the bottom. A slide corresponding to a sub-slice may have the title of the nearest above subtitle extracted from the source content. If two slides have the same titles then an extra rank corresponding to the sub-slice order in the final presentation may be added to the slide's title. For instance, the first book-chapter may start with the sub-slice that is ranked first in the chapter (its introduction for example) and will have "Introduction" as title.

A text-to-speech module 266 may be employed to add narration to the target document. For instance, the textual content included in the target content may be narrated via audio data generated from the text-to-speech module 266. Some embodiments include a translator module 268 that generates a translation from one natural language to another natural language. Thus, the source content may be in a first language (such as but not limited to French) and the corresponding target content may be translated into a second language (such as but not limited to English). The animation module 270 may animate the target document. For instance, the target document may be animated to create a video or a movie target document.

A multidimensional (MD) and multi-layered (ML) module 272 may transform the target document into an MD or ML target document. For instance, 2D tables, figures, images, equations and the like may be transformed into high dimensional or layered structures. An intelligence module 276 may incorporate other available tools or interfaces into the target document. For instance, various calculation, engineering, scientific, or other intelligent tools available online may be incorporated into the target document, via intelligence module 276. For instance, intelligence module 276 may employ various APIs to include tutorial or calculation tools into the target document. A cross-reference module 274 may cross-reference and/or correlate the target document with other related references and/or documents relating to a similar and/or an equivalent subject.

Once generated, updated (edited by the user), and correlated with other documents, the target content publisher engine 280 may publish one or more versions or types of the target document. An application generator module 282 may generate either mobile and/or desktop application versions of the target document. The application generate module 282 may generate corresponding source code, and compile the source code into application for various operating systems. A distributing computing module may push the applications and/or target documents to various distributed computing systems, such as cloud-based platforms, online content/application retailors, and the like.

Generalized Processes for Generating a Target Document

Processes 300-600 of FIGS. 3-6 will now be discussed. Briefly, processes 300-600 may be employed to generate and publish a target document, based on a source document, as discussed in conjunction with the various embodiments herein. Such processes may be implemented, executed, or otherwise performed via a single and/or a combination of computing devices, such as but not limited to user-computing devices 102-108 of FIG. 1 or computing device 700 of FIG. 7. A documentary generation application (DGA), such as but not limited to DGA 120 of FIG. 1 or DGA 200 of FIG. 2 may implement at least portions of processes 300-600.

Figure 3:
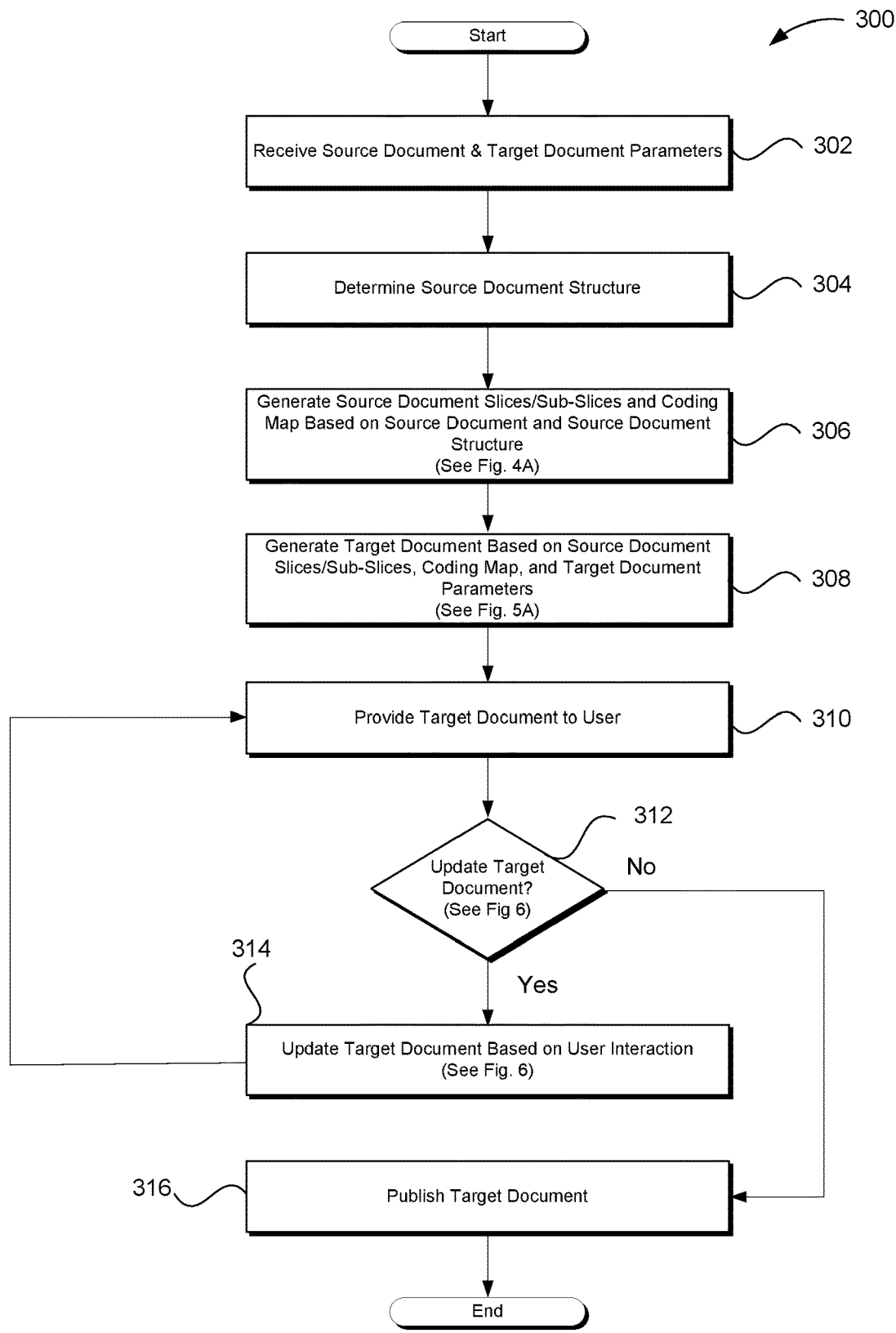
FIG. 3 illustrates one embodiment of a process flow for generating a target document that is consistent with the various embodiments presented herein.

FIG. 3 illustrates one embodiment of a process flow for generating a target document that is consistent with the various embodiments presented herein. Process 300 begins, after a start block, at block 302 where a source document and one or more target document parameters are received. The source document may be virtually any document. In embodiments where the textual content of the source document is not readily available, an optical character recognition (OCR) analysis may be performed on the source document. The target document parameters may include at least the level and rank indexes of source content to include in the target document. For instance, UI engine 220 may receive the source document and the target parameters.

At block 304, the source document structure is determined. The source document learner module 242 of FIG. 2 may be employed to determine the hierarchical source document structure. Determining the source document structure may include determining and/or learning the source document's features. At block 306, a plurality of source document slices and source document sub-slices are generated based on the source documents and the source document structure. Furthermore, a coding map is generated at block 306. Various embodiments for generating slice, sub-slices, and a coding map are discussed in conjunction with at least process 400 of FIG. 4A.

However, briefly, a slice includes and/or is associated with a section or portion of the source content, based on the source document structure. A sub-slice includes and/or is associated with a sub-portion of the portion of the source content associated with a parent slice. For instance, a particular slice may be associated with a chapter of the source document. A sub slice (of the particular slice) may be associated with a section of the chapter. Still another sub-slice (of the sub-slice) may be associated with a sub-section of the section of the chapter. Thus, slices/sub-slices may be arranged in a hierarchical structure, similar to the determined hierarchical structure of the source document. Sub-slices may contain sections from two different slices. For instance, if a figure is physically located in a previous slice of the document but is called of the sub-slice text then it will be also included in the sub-slice.

In some embodiments, a slice/sub-slice may include structure data and/or be a data structure that includes a link, pointer, or address to the associated source content. A slice/sub-slice coding map entry is generated for each slice/sub-slice at block 306. The coding map entry may be based on the source document, the source document structure, and the target document parameters. A coding map entry for a particular slice, may include the link, pointer, or address of the associated source content, as well as other data and/or metadata associated with the slice. A source document segmentation engine, such as but not limited to source document segmentation module 244 of FIG. 2 may be employed to segment the source content into a plurality of slices/sub-slices.

At block 308, the target document is generated. The target document may be based on the source document slices/sub-slices, the coding map, and the one or more target document parameters. For instance, target generation engine 260 may generate the target document. Various embodiments for generating the target document are discussed in conjunction with at least process 500 of FIG. 5A. However briefly here, the source content associated with at least a portion of the slices/sub-slices are analyzed and/or processed to generate target content. Additional target content may be generated based on external and/or other sources. Additional source content may be generated via one or more user interactions. The target content is aggregated and re-formatted via one or more dynamically determined templates to generate the target document.

At block 310, the target document is provided to a user. At decision block 312 it is determined whether to update the target document. For instance, a user may provide one or more edits, via user interactions, to implement to the target document. If the target document is to be updated process 300 flows to block 314. Otherwise process 300 flows to block 316.

At block 314, the target document is updated based on user interactions and/or user-provided edits. Various embodiments for updating a target document are discussed in conjunction with at least process 600 of FIG. 6. However, briefly, here, the target document may be updated to include the user edits, such as but not limited to re-formatting the target document, additional target material, or the like.

At block 316 the target document is published. The target document may be published to a distributed computing system, such as but not limited to a cloud platform, an online content/application retailer, web service, or the like. Also at block 316, the target document may be stored for subsequent use and/or viewing, if requested by the user. As noted throughout, in some embodiments, only the coding map (and the source document) may be required to be stored because the target documents may be re-generated in real time. Updates to the coding map may enable updates to the document or a portion of the document. Process 300 may terminate and/or return a calling process.

Figure 4A:
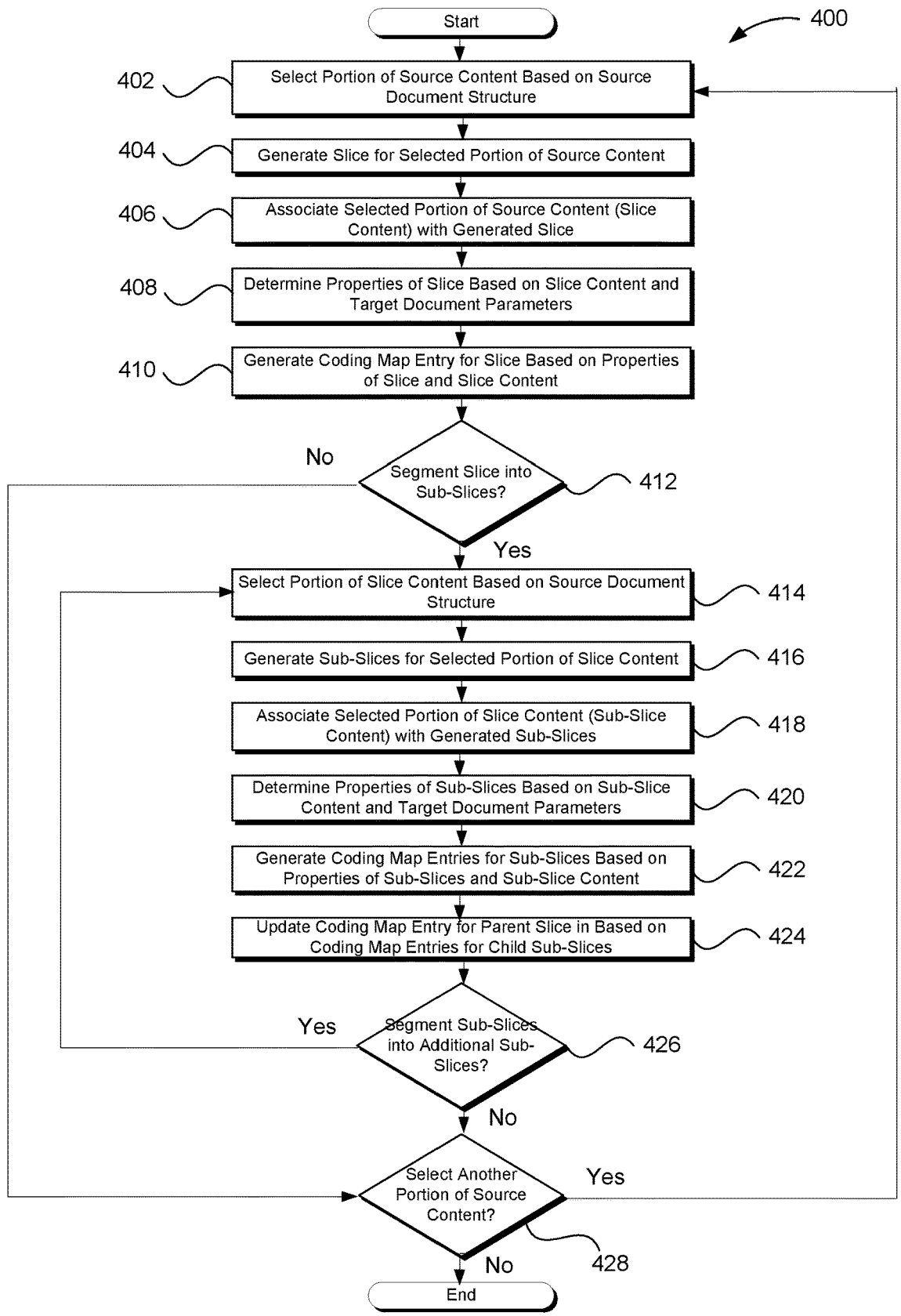
FIG. 4A illustrates one embodiment of a process flow for segmenting a source document into slices and sub-slices, as well as generating a coding map for the segmented source document that is consistent with the various embodiments presented herein.

FIG. 4A illustrates one embodiment of a process flow for segmenting a source document into slices and sub-slices, as well as generating a coding map for the segmented source document that is consistent with the various embodiments presented herein. Process 400 begins, after a start block, at block 402 where a portion of the source content is selected. The selected source content may be based on the source document structure. For instance, a particular chapter, section, subsection, figure, table, or the like from the source document may be selected at 402.

At block 404, a slice is generated for the selected portion of the source content. At block 406, the selected portion of the source content is associated with the generated slice. When referring to a particular slice, the associated portion of the source content may be referred to as the slice content.

At block 408, one or more properties of the slice are determined based on the slice content and the target document parameters. As noted above, slices may be placed in a hierarchical structure. As such, each slice may have a particular level index (n) and a particular rank index (r). Accordingly the level and rank of an index may be determined at block 408.

In one exemplary embodiment, if the slice content is a chapter, the level index may be set to zero, i.e. n=0 for the slice. The rank index may refer to the chapter number. For instance, the level and rank indexes (n,r) for the first chapter of the source document may be set to (0,0) and the level and rank indexes for the second chapter may be set to (0,1). For the main sections in a chapter, the level index may be set to n=1, for the sub-section, the level index may be set to n=2, and the like. Thus, the source document structure may be used to determine the schema for determining the level and rank of each slice.

Other determined properties may include a type of the slice, a title of the slice, a length of the slice, one or more priorities of the slice, one or more weights associated with the slice, and the like. One or more addresses, links, indexes, and/or pointers that indicate a location of the slice content may be determined at block 408. For instance, a first index that indicates the location of the beginning (or start) of the slice content and a second index indicating the end of the slice content may be determined.

Further addresses, links, indexes, and/or pointer for external resources, such as databases, dictionaries, libraries and the like may be determined at block 408. Such external resources may provide additional content (relating to the slice content) to include in the target document. Such external resources may include local or global supporting documentation, such as but not limited to databases, dictionaries, libraries, online encyclopedias, and the like.

At block 410, the coding map entry for the slice is generated. The coding map entry for the slice may be based on and/or include the various properties of the slice determined at block 408. FIG. 4B illustrates an exemplary embodiment of coding map entry for a slice of a source document. More particularly, table 440 shows a data structure for the entries of N slices.

At decision block 412, it is determined whether the slice is to be further segmented into one or more sub-slices. For instance, if the slice content contains multiple figures, equations tables, of the like, the slice may be recursively segmented into a plurality of sub-slices. In one exemplary embodiment, the source content is recursively segmented into slices and sub-slices such that each sub-slice includes an amount of sub-slice content small enough to fit on a single slide. If the slice is to be further segmented into one or more sub-slices process 400 flows to block 414. Otherwise, process 400 flows to decision block 428.

At decision block 428, it is determined whether an additional portion of the source content is to be selected. For instance, the next chapter of the source document may be selected next. If another portion of the source content is to be selected, process 400 returns to block 402. Otherwise, process 428 may terminate and/or return a calling process.

At block 414, a portion of the slice content is selected based on the source document structure. For instance, if the slice corresponds to a chapter, then a section of the chapter is selected at block 414. At block 416, one or more sub-slices for the selected portion of the slice content are generated. At block 418, the selected portion of the slice content (herein referred to as sub-slice content) is associated with the generated sub-slices. In some embodiments, multiple sub-slices may be combined or merged into a single slice based on the size of the multiple slices, i.e. if the multiple slices can fit in the single slice. This is calculated based on the size of the slice and the contents dimensions (width, lengths of items as well as the number of words and paragraphs).

At block 420, various properties of the sub-slices are determined based on the sub-slice content and the target document parameters. The properties of a sub-slice may be similar to the properties of a slice. For instance, a sub-slice may include corresponding level and rank indexes, types, titles, lengths, index characters (links or pointers to the sub-slice content), priority, weight, and the like.

As noted throughout, the sub-slice content may be a figure, table, equation, image, or the like. Accordingly, the determined properties of a sub-slice may include a pointer, address, link or other indication of the location of the explicative text in the source document related to the figure, table, equation, image, or the like. Furthermore, the determined properties may include indications of the locations of the legends, captions, and the like of the figures, tables, equations, images, medias (videos), etc. Other determined properties may include other references, appendixes, weblinks, or the like relating to the sub-slice content.

At block 422, code map entries for the sub-slices are generated. The code map entries for the sub-slices may be based on the determined properties of the sub-slices. FIG. 4C illustrates an exemplary embodiment of coding map entry for a sub-slice of a source document. Table 460 is similar to table 440 and shows a data structure for the entries of N sub-slices. Not the additional data/metadata indications included for sub-slices.

At block 424 the coding map entry for the parent slice of the sub-slices is updated based on the coding map entries for child sub-slices. For instance, addresses, pointers, links, or other indications of the location of the coding map entries for the child sub-slices may be included in the coding map entries for the parent slice. FIG. 4D illustrates an exemplary embodiment of updated coding map entry for a slice of a source document. Table 480 is an updated version of table 440 of FIG. 4B. Note the additions for the address or pointers to the child sub-slices coding map entries. When a sub-slice is further segmented into additional sub-slices, the coding map entries for the sub-slices may be updated at block 424 to include pointers to the coding map entries for the further segmented sub-slices. Thus coding map entries for slices and sub-slices may include linked-lists.

In some embodiments, all slices (including parent and sub-slices) may be associated with the same format for their entries in the coding map. They will have the same coding map at the end (parent slice, sub-slice, etc.). One such exemplary, but non-limiting format is as follows:

---

(*sliceIndex:33, sliceNumber:23, level:7, rank:141, weight, priority, titleAddr:91, iWorkItem:Figure 1.4, ratioImg:0.68, imgW:547, imgH:210, imgPosX:239, imgPosY:500, legW:874, legH:10, legPosX:75, legPosY:721, bodyPosX:75, bodyPosY:220, bodyW:874, bodyH:272, addrItem:7, addrLegend:147, explicativeText:141, offsetItem: , numParagraphs:3, addrParagraphs:141, 156, 157, numWords:141, 74, 70, transProperties:, presenterNotes:157, rePartitionFlag:false, templateID:2, summarizeEnabled, animationEnabled, narrateEnabled, referenceEnabled, scientistEnabled, addSupportingDocs: , indexKeywords: , animateItem: , MLMDItem: *)

---

In this example: the target document includes 124 slices/slides and the contents of slice 33 are shown here. If animation was initially enabled, then the target document may include significantly more slices as the contents will be split over many sub-slices.

Global data for each of the slices may include, but is not otherwise limited to:

--- org. DocId: If the document has changed then the coding map will have to be regenerated.
language: can be local or global to the slice
NumberSlices: number of Slices
animationEnabled: Yes/No: animate Slice
narrateEnabled: Yes/No: narrate Slice
referenceEnabled: Y/N: allow links to additional documentation (web/cloud, local, etc.)
scientistEnabled: Yes/No: allow scientific (mathematical, etc.) calculations of the cited equations in the document. These calculations can be automatically animated as well.
addSupportingDocs: Internal (already stored docs), External (cloud-based or web available (Google, Bing, etc.), both (will look everywhere), none. This will enable a bullet for document opening such as excel/numbers file to include all or a few tables of the original doc. Other parameters will also indicate how to animate these tables to allow for instance automated calculations of the table result columns and/or rows per the tables' contents.

---

Local data for each of the slices may include, but is not otherwise limited to:

--- sliceIndex: index of slices (including slices and sub slices)
sliceNumber: original Slice that was sliced in more slices
level: Body text, figure, equation, table, etc.
rank:
weight:
priority:
titleAddr: address of the title-text of the slice in the original document
iWorkItem: selected Figure(s), table(s), formula(s), media(s), etc. in the original doc.
ratioImg: Original Ratio of the iWorkItem, this is needed for automated layout, to avoid distortion of the result image and comparing images sizes of images to each other
imgW: Width of the item (table, figure, equation, etc.), imgH: Height of the item
imgPosX: x-abscise coordinate in the final slide, imgPosY: y-abscise coordinate
legW: Width of the legend of an item (table, figure, equation, etc.), legH: Height of the item
legPosX: x-abscise coordinate, legPosY: y-abscise coordinate
bodyW: Width of the body text, bodyH: Height of the body text
bodyPosX: x-abscise coordinate, bodyPosY: y-abscise coordinate
addrItem: address of the title-text of the slice in the original document,
addrLegend: address of the item legend in the original document,
explicativeText: address of the paragraph where the legend is referenced,
offsetItem: location of each item in the paragraph explicative text,
numParagraphs: # of paragraphs to include in slice,
addrParagraphs: addresses of paragraphs to include in slice,
numWords: # of words in each paragraph
transProperties: animation properties (flash, appear, disappear, etc.),
presenterNotes: address of presenterNotes,
rePartitionFlag: slice should be split again,
reCombineFlag: slice should be recombined with another slice,
templateID: index of the final slice template (how to layout figures and images). It is selected automatically by the algorithm based on the images/text/legends/etc. A template can have more than one item (table, figure, etc.) if that fits in a slide. Sizes and coordinates of items will be calculated accordingly to auto layout all of the slice constituents. In the case where many templates (programmed in the algorithm) can fit the slice constituents, the final template will be selected randomly. As a result, the final movie display and organization is always unexpected to the user so it will give it the feel of a real movie.
summarizeEnabled: Yes/No: summarize text in Slice(s), which may combine text from several slices
animationEnabled: Yes/No: animate Slice
narrateEnabled: Yes/No: narrate Slice
referenceEnabled: Y/N: allow links to additional documentation (web/cloud, local, etc.)

-continued scientistEnabled: Yes/No: allow scientific (mathematical, etc.) calculations of the cited equations in a Slice. These calculations can be automatically animated as well.
addSupportingDocs: Internal (already stored docs), External (cloud-based or web available (Google, Bing, etc.), both (will look everywhere), none. This will enable a bullet for document opening such as excel/numbers file to include all or a few tables of the original doc.
indexKeywords: range of words to use to find appropriate documentation
animateItem: item can be ungrouped and each block animated separately. For instance, items in a table can be added one by one or calculated based on other data included in other rows and columns.
MLMDItem: Y/N: transform item to ML/MD item. For instance, figure will be ungrouped and each item provided additional dimensions (3D for instance). The text can be translated to 3D graphics. This is very clear with Virtual Device & Circuit tool (Provisional Patent Application No. 62/425,011), where device models can be given a third dimension and multiple layers (process, device, design, etc.).
nScene: indicates the number of scenes included in a slice
sceneW: scene Width; sceneH: scene Height; sceneMD: scene multi-dimensions (3, 4, etc.); sceneML: The layers that it will allow to view; autorotate: Y/N; showCross-Section: Y/N; sceneSeqAng: sequence of angles to view during the slice viewing. In addition to this list, some of these angles will be generated randomly so the viewing of the scene will look random. Some of the scenes may be extracted from text or contained figures or automatically reconstructed based on current contents or similar contents located at other references.

Thus, in some embodiments, all content extracted from the source document and/or content generated to be added to target document may be encoded in the coding map.

At decision block 426, it is determined whether to further segment a sub-slice into additional sub-slices. For instance, if a sub-slice corresponds to a section in a chapter of the source document, the sub-slice may be further segmented into sub-sections. Similarly, a sub-slice may be further segmented into additional sub-slices, that each corresponds to a figure, table, equation or the like. If the sub-slice is to be further segmented, process 400 returns to block 414. Otherwise, process 400 flows to decision block 428.

Figure 5A:
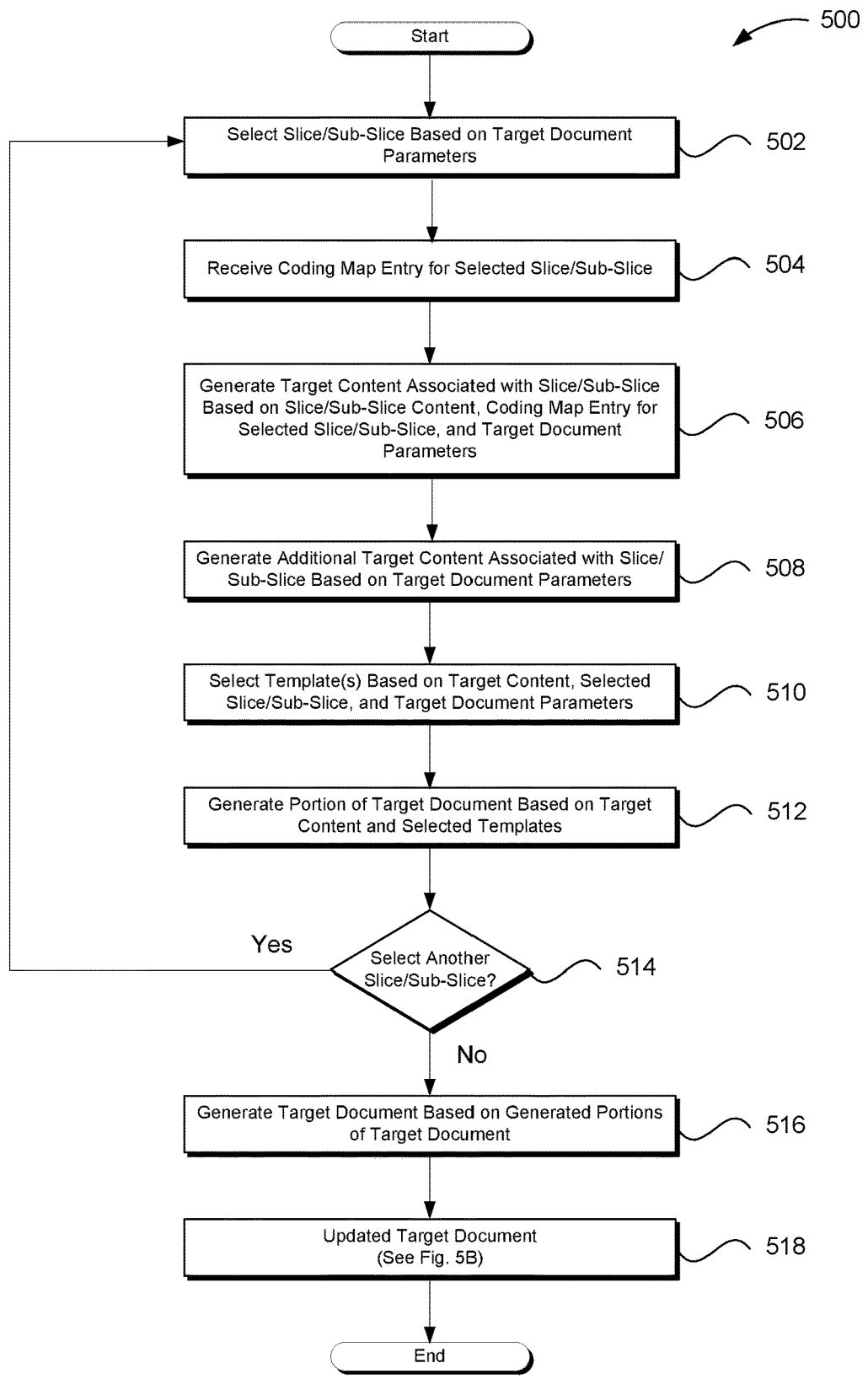
FIG. 5A illustrates one embodiment of a process flow for generating a target document that is consistent with the various embodiments presented herein.

FIG. 5A illustrates one embodiment of a process flow for generating a target document that is consistent with the various embodiments presented herein. Process 500 begins, after a start block, at block 502 where a slice or a sub-slice is selected. The selected slice or sub-slice is based on the target document parameters. As noted throughout, the target document parameters may indicate the portions of the source content to include in the target document corresponding to level and rank indexes. Accordingly, the selected slice or sub-slice may be based on the level and rank of the source content as indicated by the target document parameters.

At block 504, the coding map entry for the selected slice or sub-slice is received. In at least one embodiment, the coding map entry for the selected slice or sub-slice is retrieved. At block 506, target content associated with the selected slice or sub-slice is generated. The target content may be based on the slice or sub-slice content, the coding map entry for the selected slice or sub-slice, and the target document parameters. In at least one embodiment, the target content may include at least a portion of the slice or sub-slice content. At block 508 additional target content associated with the selected slice or sub-slice is generated.

At block 510, a template is selected. The template may be selected from a plurality of predetermined templates. The template may be a template for a slide. The template may be based on the target content, the selected slice or sub-slice, or the target document parameters. At block 512, a portion of the target document is generated based on the target content and the selected template. For instance the target content may be laid out or included in the target document in the manner dictated by the template, At decision block 514 it is determined whether to select another slice or sub-slice. If another slice or sub-slice is to be selected process 500 returns to block 502. Otherwise process 500 flows to block 516. At block 516 the target document is generated based on all the generated portions of the target document. For instance, the portions of the target document may be aggregated into a single target document.

At block 518, the target document may be updated. Various embodiments for updating a target document are discussed in conjunction with at least process 560 of FIG. 5B. Process 500 may terminate and/or return a calling process.

Figure 5B:
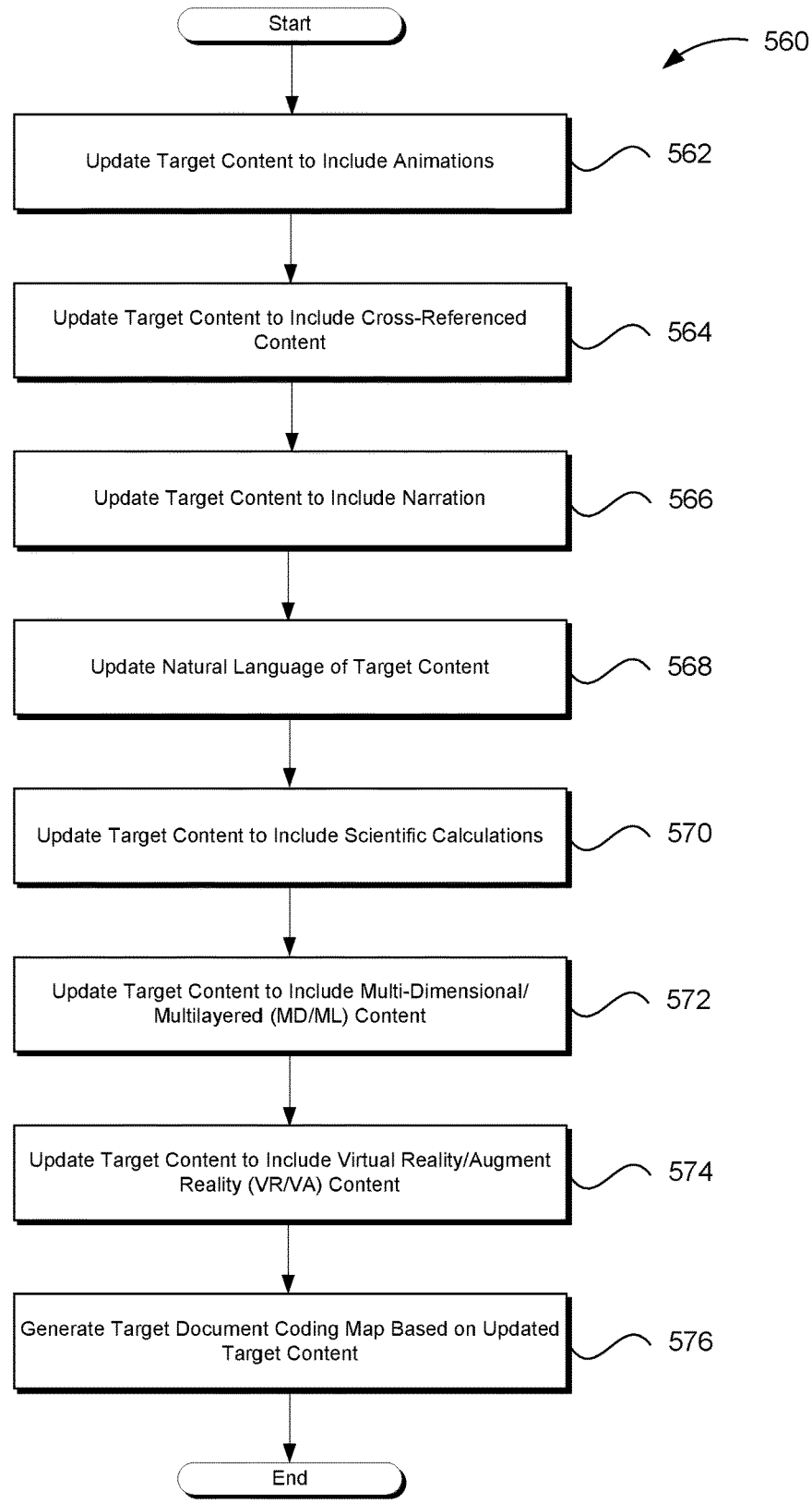
FIG. 5B illustrates one embodiment of a process flow for updating a target document that is consistent with the various embodiments presented herein.

FIG. 5B illustrates one embodiment of a process flow for updating a target document that is consistent with the various embodiments presented herein. In some embodiments, if requested by the user, all source content may be initially encoded in the coding map. The various embodiments may display only what is encoded in the coding map, which can be updated continuously with the user settings. In other words, the target document can be from the start animated/narrated/allowing cross-referencing/summarized/translated entirely to symbolic representations (figures, shapes, etc.) with no text or little text (headlines).

If the user has requested animation initially or at any time during the document generation, then the target document will be automatically generated (if initially is selected) from the start with animations per the user requests and selections. Similarly, cross-reference, narration and translation to other languages can also be requested initially or at any time during the document generation and be automated by the tool. The user may also update the target document with additional animations that will be interpreted and added to the source code and the coding map. The coding map is a reflection of the target document(s).

Process 560 begins, after a start block, at block 562 where the target content is updated to include animations. For instance if the target document is to be a movie or video, then slides included in the target document may be animated to generate a movie. If the user has requested animation initially or at any time during the document generation, then the target document will be automatically generated (from the start if initially is selected) with animations per the user requests and selections. Similarly, cross-reference, narration and translation to other languages can also be requested initially or at any time during the document generation and be automated by the tool. The user may also update the target document with additional animations that will be interpreted and added to the source code and the coding map. The updated coding map is a reflection of the target document.

At block 564, the target content is updated to include cross-referenced content; for instance, external content that is included in the target content may be cross-referenced and updated at block 564.

At block 566, the target content may be updated to include narration. For instance, a text-to-speech module may be used to narrate textual content included in the target content.

At block 568 the natural language of the target content may be updated. For instance the natural language of the target content may be translated from a first language to a second language via a translator module, such as but not limited to translator module 268 of FIG. 2. At block 570, the target content may be updated to include various scientific calculations. For instance, calculations performed by a scientist module may be updated. At block 572, the target content may be updated to include multi-dimensional and/or multi-layered (MD/ML) content. At block 574, the target content may be updated to include various virtual reality and/or augmented reality (VR/AR) content. For instance, the MD/ML content included in the target content may be employed to generate at least a portion of the VR/VA target document content.

At block 576, a target document coding map may be generated based on the updated target content. In some embodiments, the tar document coding map is not generated until the generation of a target document. The target document coding map may be a coding map that includes slices and/or sub-slices that reflect the target content of the target document, in a similar and/or analogous way that other coding maps reflect the source content of a source document. Thus, the target document coding map may be employed, via the various embodiments discussed herein to generate additional target documents, based on the target document being generated via process 560. In at least one embodiment, the target document coding map includes a reference, link, pointer, or address to the generated target document. Thus, as discussed herein, if the target document and/or the target document coding map is updated and/or edited the corresponding target document coding map/target document may be correspondingly updated. In at least one embodiment, an updated target document coding map may be employed to generate additional target documents including additional and/or alternative target documents based on the updated and/or edits to the target document coding map. Process 560 may terminate and/or return a calling process.

Figure 6:
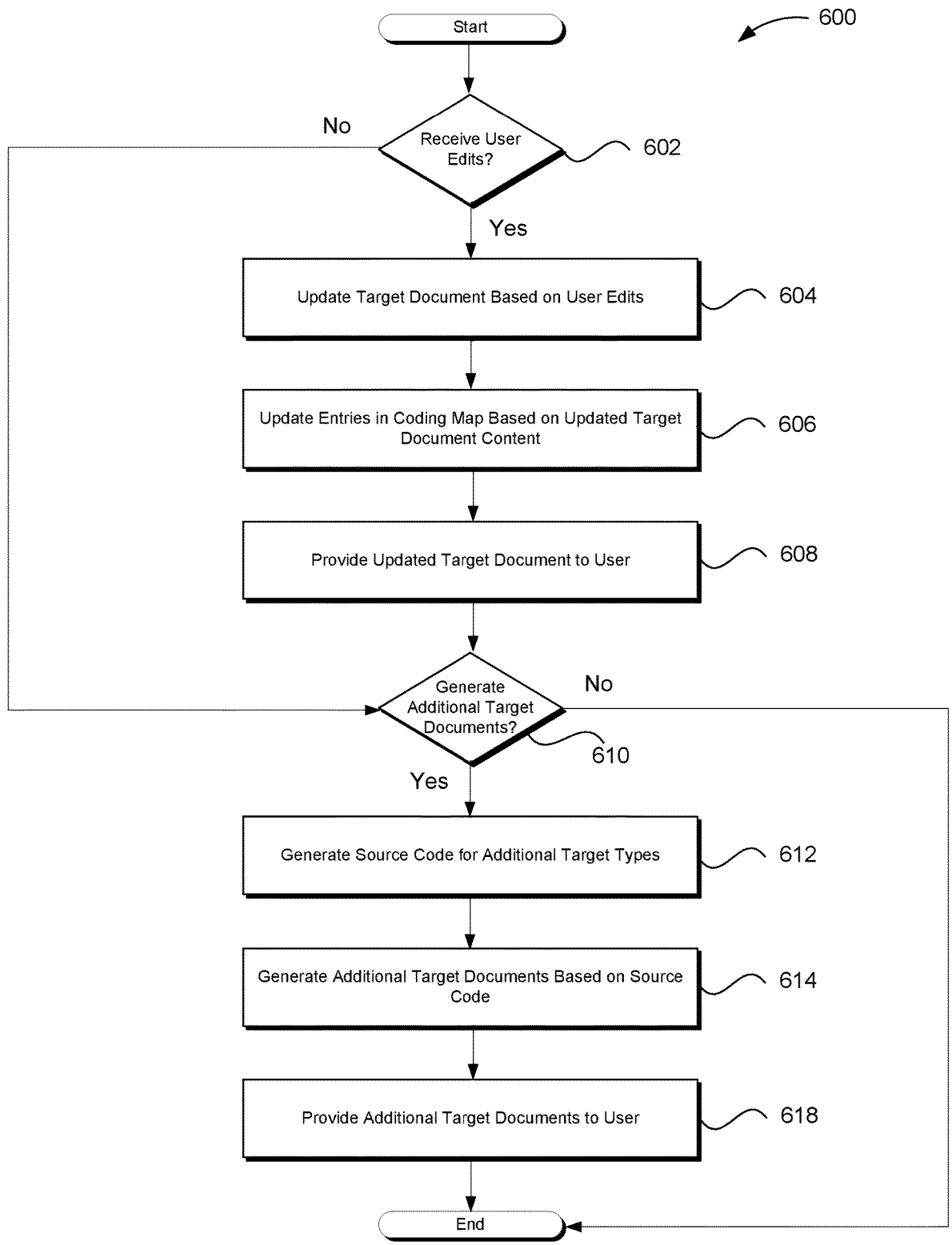
FIG. 6 illustrates one embodiment of a process flow for enabling a user to edit a target document that is consistent with the various embodiments presented herein.

FIG. 6 illustrates one embodiment of a process flow for enabling a user to edit a target document that is consistent with the various embodiments presented herein. Process 600 begins, after a start block, at decision block 602 where it is determined whether user edits have been received. For instance the user may provide edits for the target document. If no user edits have been received, process 600 flows to decision block 610. If user edits have been received process 600 flows to block 604. Updates can relate to a single or multiple slices. Updates may be stored for future iterations as well as in the stored coding map, if the user requested to save his updates.

At block 604, the target document is updated based on the user edits. At block 606, the entries in the coding map are updated based on the updated target content. For instance the coding map entries for these slices and/or sub-slice is associated with the updated target content may be updated to reflect the updates to the target content. At block 608, the updated target document is provided to the user.

At decision block 610, it is decided whether to generate additional target documents. For instance other document types may be generated based on the target document. If no additional target documents are to be generated process 600 may terminate and/or return a calling process. If additional target documents are to be generated, process 600 flows to block 612.

At block 612, source code for additional target types may be generated. For instance source code to generate a desktop and/or a mobile application may be generated.

At block 610 for the additional target documents may be generated based on the source code. For instance the source code may be compiled into one or more applications.

At block 618 the additional target documents may be provided to the user. Process 600 may terminate and/or return a calling process.

Figure 7A:
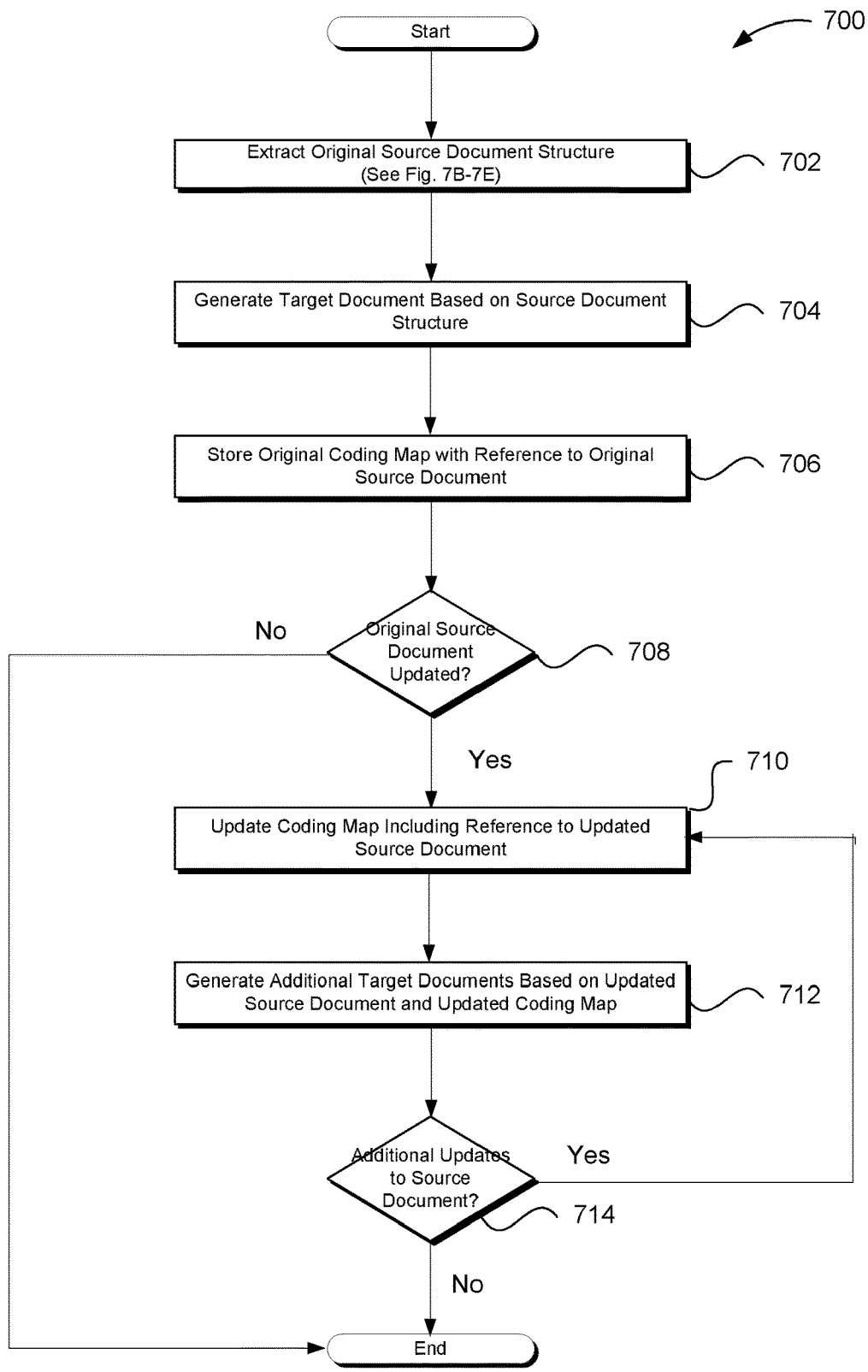
FIG. 7A illustrates one embodiment of a process flow for updating the coding map based on updates to the source document and generating additional target documents based on the updated coding map that is consistent with the various embodiments presented herein.

FIG. 7A illustrates one embodiment of a process flow for updating the coding map based on updates to the source document and generating additional target documents based on the updated coding map that is consistent with the various embodiments presented herein. At block 702, the source document structure is extracted based on the original source document. The structure may be extracted from contents embedded in document (for instance in a special format), metadata associated with the source document, the document contents (texts, figures, and the like), extracted from specialized programming scripts, or the like. Various embodiments of extracting and/or determined source document structure based on the source documents are discussed throughout, including in at least conjunction with FIGS. 3 and 7B-7E.

At block 704, a first target document is generated. At block 706, and original coding map is stored. The original coding map includes a reference to the original copy of the source document. At decision block 708, it is determined whether the source document has been edited (or a copy of the source document has been edited). If so, at block 710 the coding map is updated based on the updated source document. In some embodiments, an updated copy of the coding map is generated and/or stored. Additional target documents may be generated at block 712 based on the updated coding map. Process 700 may iteratively continue until no further edits of the source document are found.

Figure 7B:
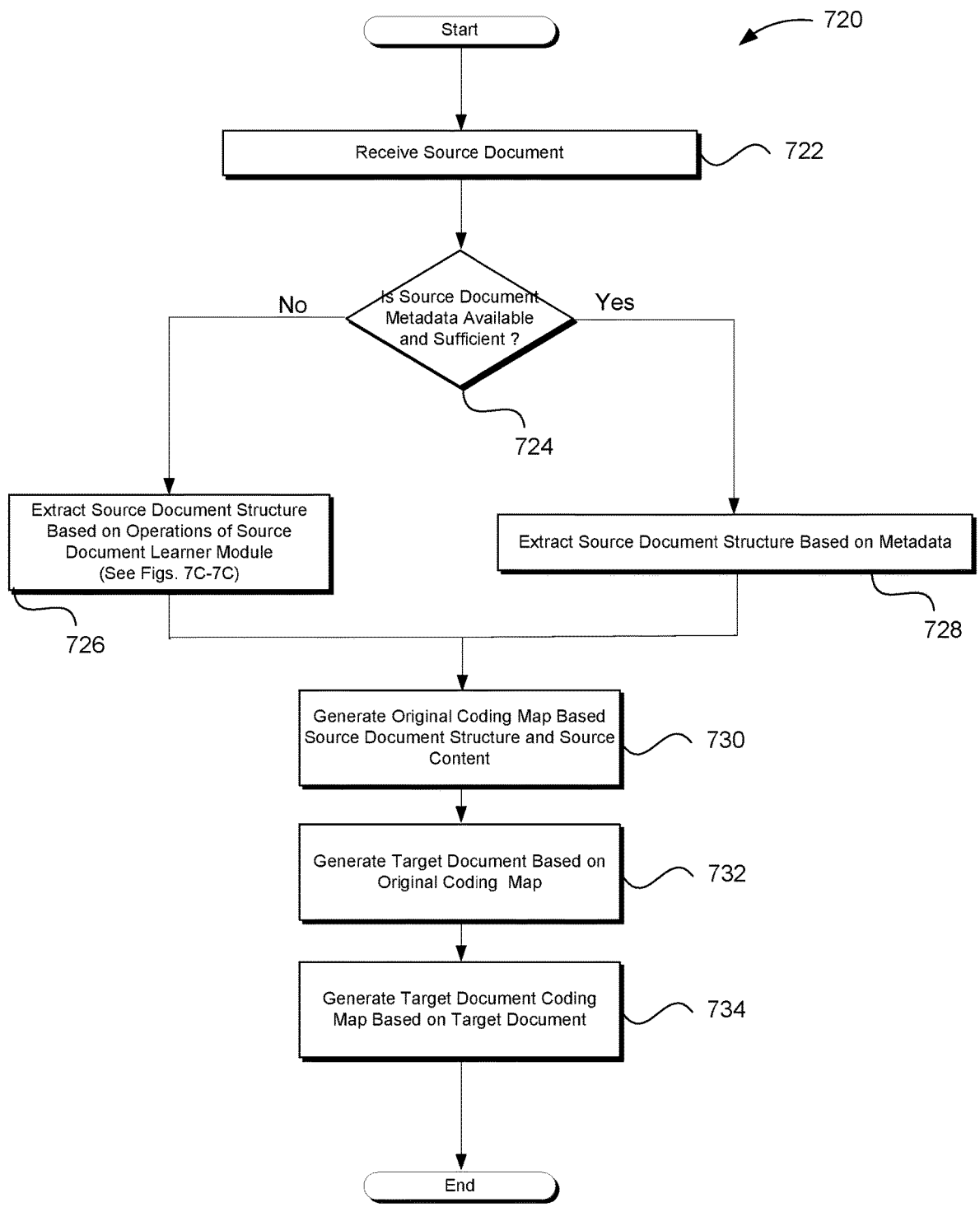
FIG. 7B illustrates one embodiment of a process flow extracting and/or determining the source document structure based on the source document that is consistent with the various embodiments presented herein.

FIG. 7B illustrates one embodiment of a process flow extracting and/or determining the source document structure based on the source document that is consistent with the various embodiments presented herein. At block 722, a source document is received. At decision block 724, it is determined whether the metadata of the source document is available and sufficient. If so, process 720 flows to block 728, where the source document structure is extracted (or determined) based on the metadata. If the metadata is not available or nor sufficient, process 720 flows to block 726.

Figure 7C:
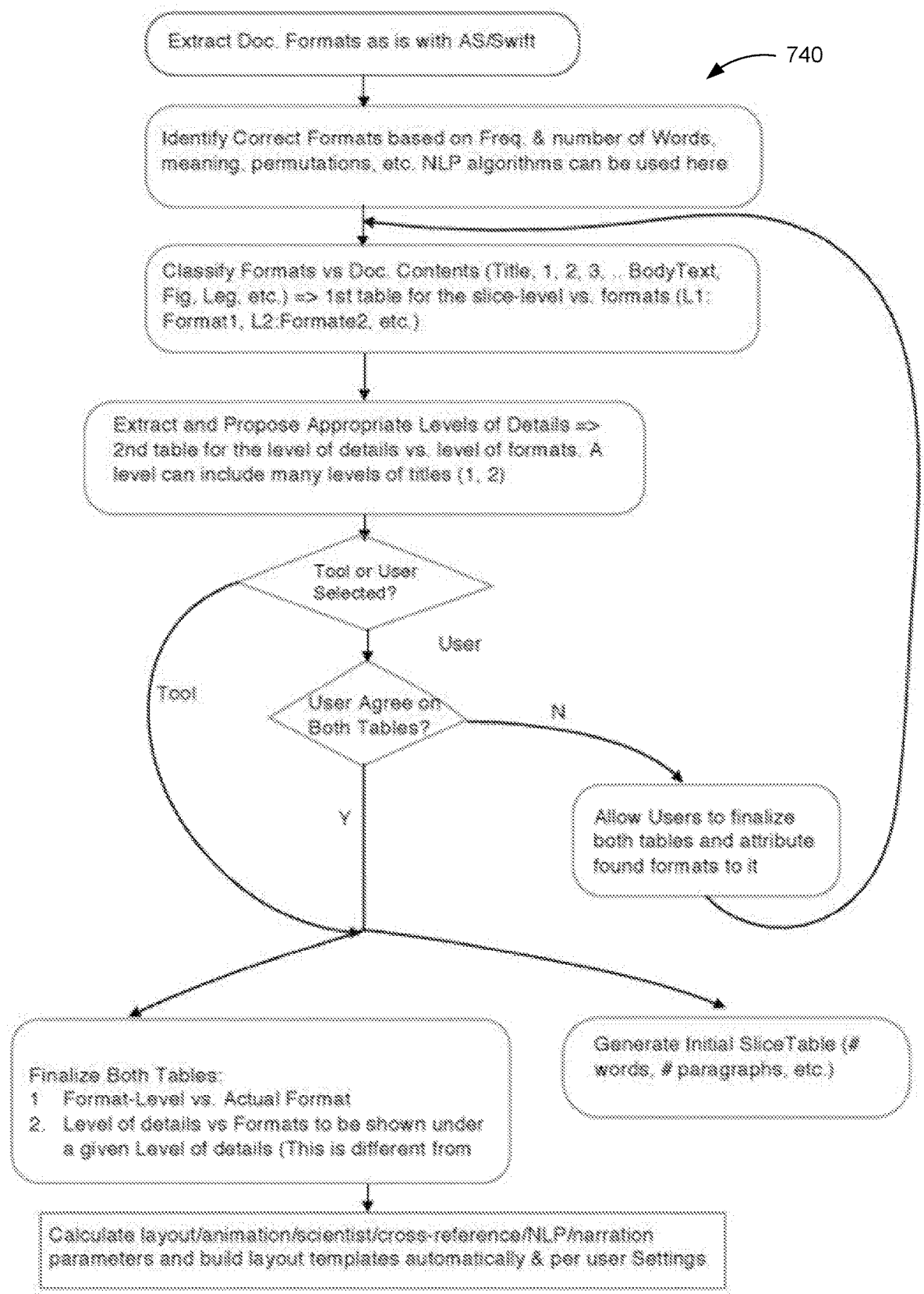
FIGS. 7C-7E illustrates three workflows employed by a source document learning module to learn and extract and/or determine the source document structure when the metadata of the source document is not available or sufficient to extract the source document structure.
Figure 7D:
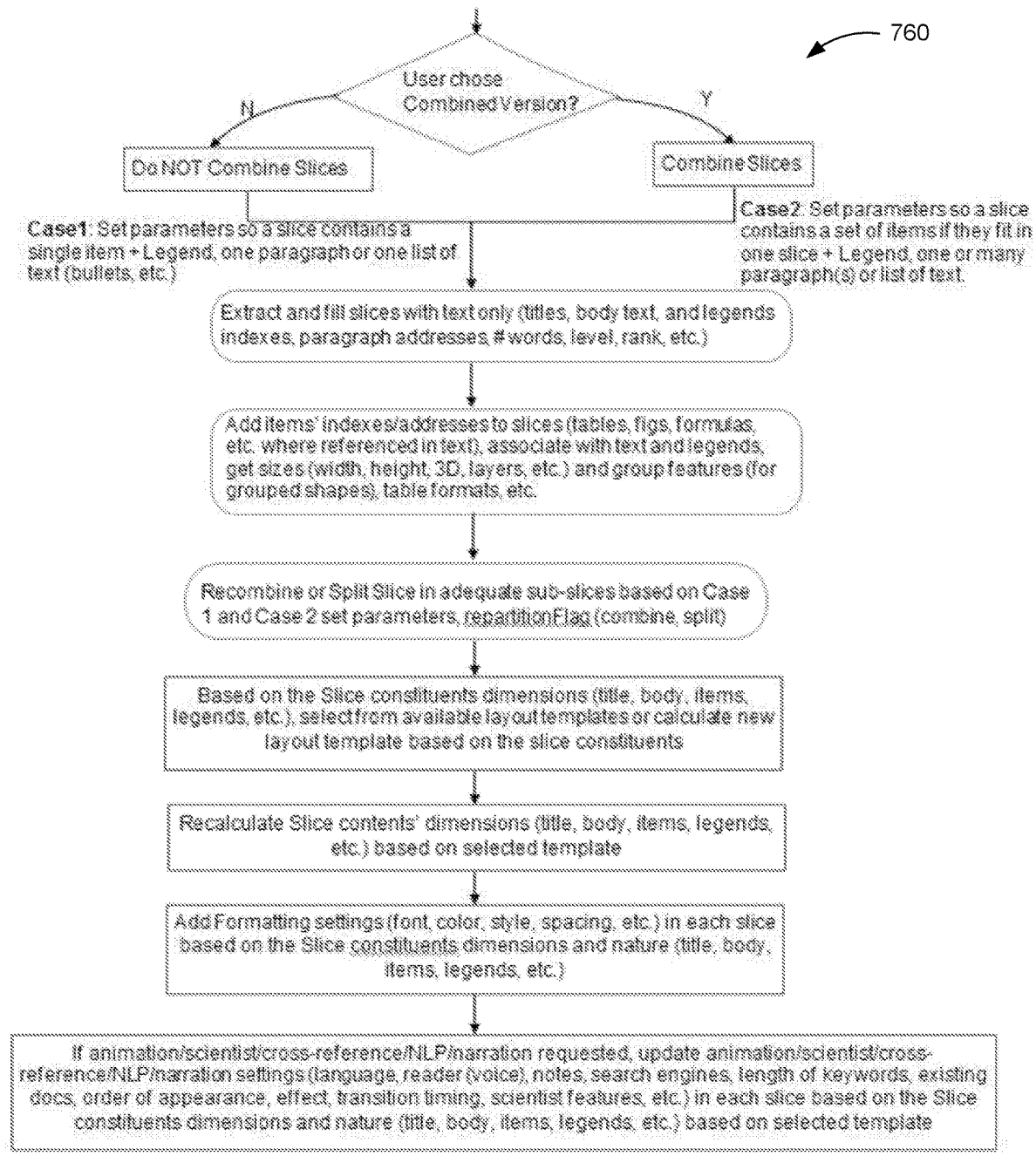
Figure 7E:
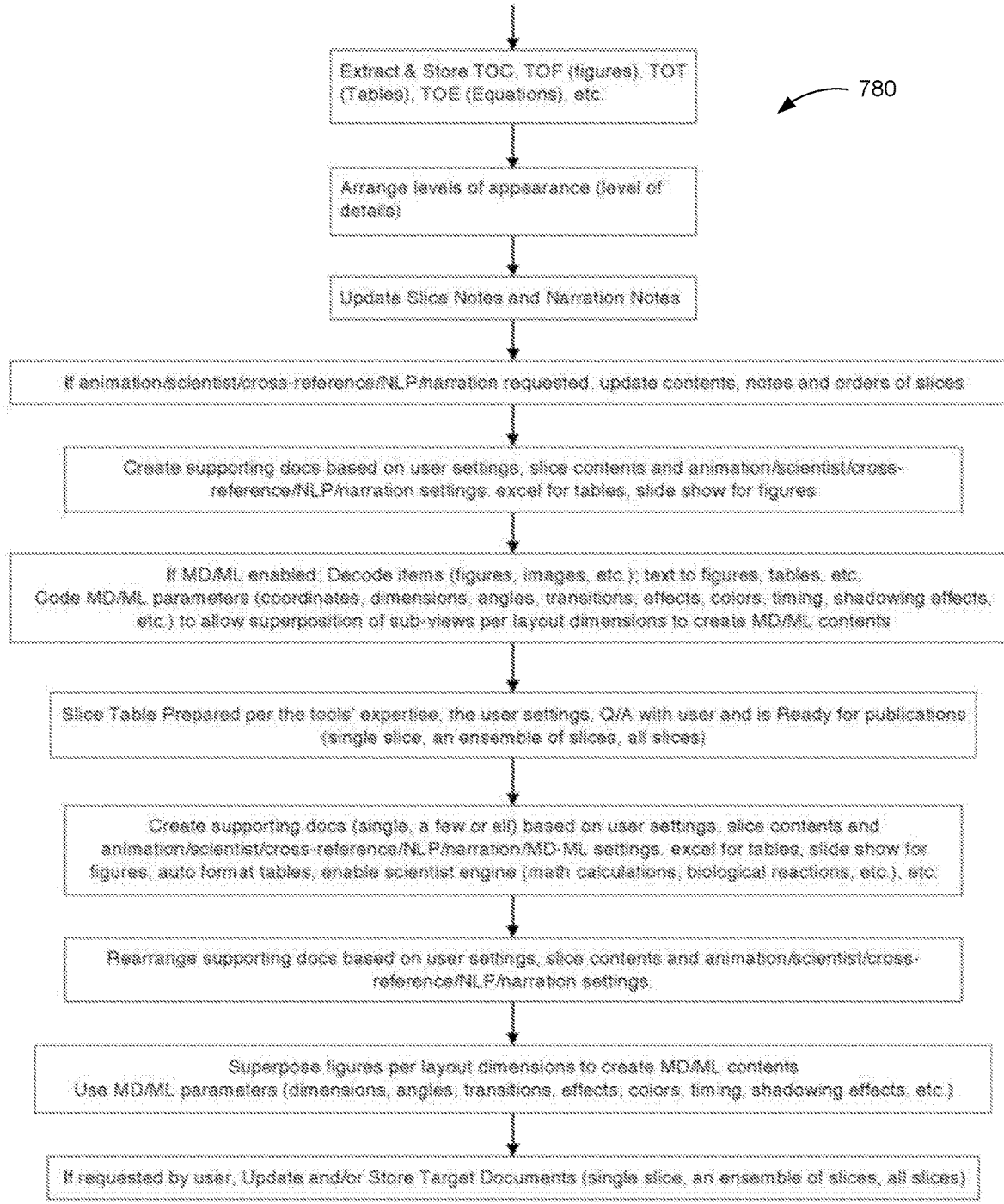

At block 726, the source document structure is extracted (or determined) based on the operations of source document learner module, such as but not limited to source document learner module 242 of FIG. 2. FIGS. 7C-7E show exemplary, but non-limiting, embodiments of the workflows of such a source document learner module.

At block 730, an original coding map is generated based on the extracted source document structure and the source content. At block 732, a target document is generated based on the original coding map. At block 734, a target document coding map may be generated based on the target document. The target document coding map may be a reflection of the target document and include one or more references, pointer, or links to the target document. As discussed herein, the target document coding map may be stored and employed to generate additional target documents.

FIGS. 7C-7E illustrates three workflows (740, 760, and 780) employed by a source document learning module, such as but not limited to source document learning module 242 of FIG. 2, source document segmentation module 244 of FIG. 2 and the target content generation module 260 of FIG. 2 to learn and extract and/or determine the source document structure when the metadata of the source document is not available or sufficient to extract the source document structure. For instance, at least portions of process 740 of FIG. 7C may be carried out via document learner module 242 of FIG. 2. Similarly, at least portions of processes 760 and 780 of FIGS. 7D-7E may be carried out via document segmentation module 244, target content generation module 260, and/or a combination thereof.

Illustrative Computing Device

Figure 8:
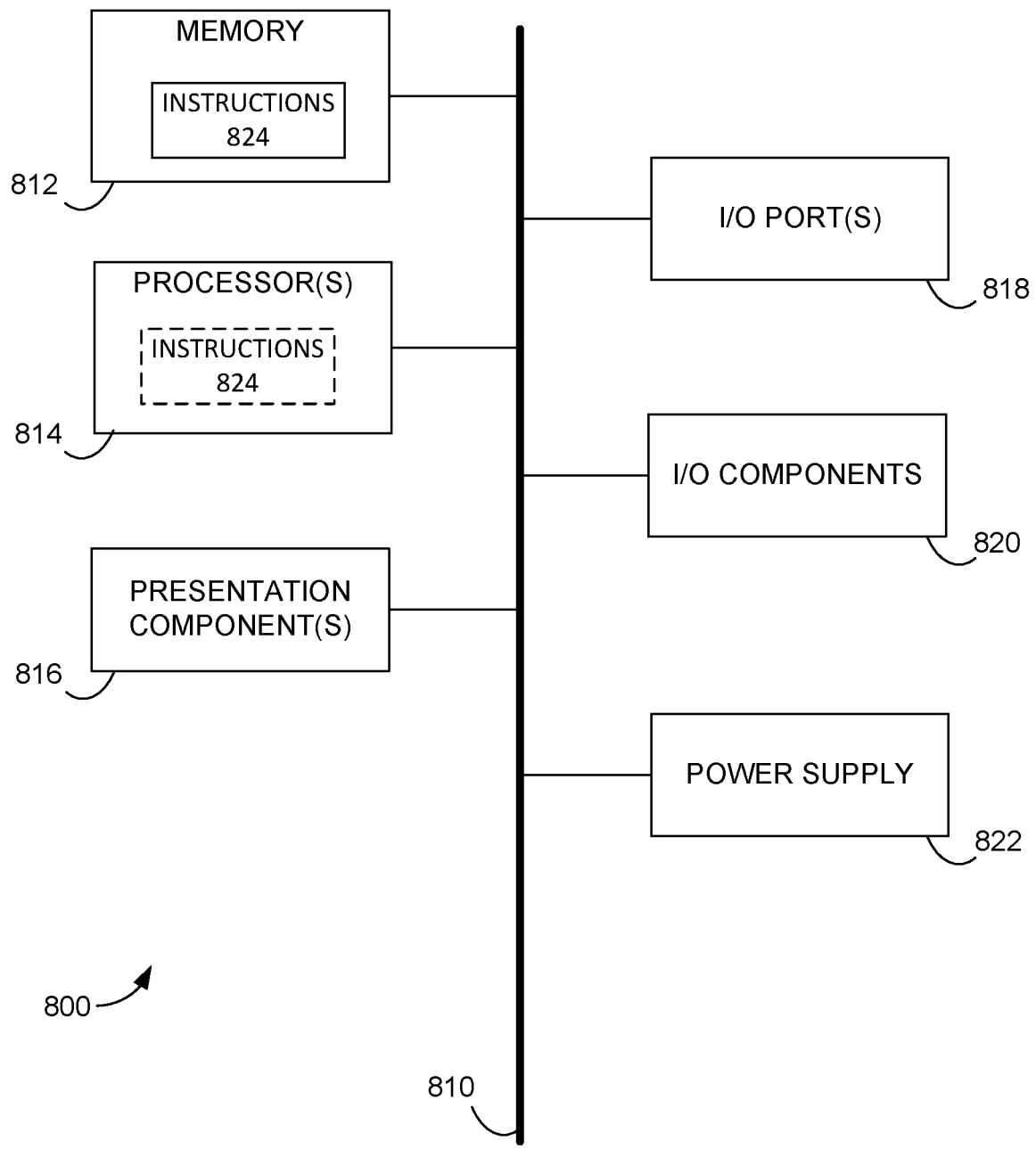
FIG. 8 is a block diagram of an example computing device in which embodiments of the present disclosure may be employed.

Having described embodiments of the present invention, an example operating environment in which embodiments of the present invention may be implemented is described below in order to provide a general context for various aspects of the present invention. Referring to FIG. 8, an illustrative operating environment for implementing embodiments of the present invention is shown and designated generally as computing device 800. Computing device 800 is but one example of a suitable computing environment and is not intended to suggest any limitation as to the scope of use or functionality of the invention. Neither should the computing device 800 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a smartphone or other handheld device. Generally, program modules, or engines, including routines, programs, objects, components, data structures, etc., refer to code that perform particular tasks or implement particular abstract data types. Embodiments of the invention may be practiced in a variety of system configurations, including hand-held devices, consumer electronics, general-purpose computers, more specialized computing devices, etc. Embodiments of the invention may also be practiced in distributed computing environments where tasks are performed by remote-processing devices that are linked through a communications network.

With reference to FIG. 8, computing device 800 includes a bus 810 that directly or indirectly couples the following devices: memory 812, one or more processors 814, one or more presentation components 816, input/output ports 818, input/output components 820, and an illustrative power supply 822. Bus 810 represents what may be one or more busses (such as an address bus, data bus, or combination thereof). Although the various blocks of FIG. 8 are shown with clearly delineated lines for the sake of clarity, in reality, such delineations are not so clear and these lines may overlap. For example, one may consider a presentation component such as a display device to be an I/O component, as well. Also, processors generally have memory in the form of cache. We recognize that such is the nature of the art, and reiterate that the diagram of FIG. 8 is merely illustrative of an example computing device that can be used in connection with one or more embodiments of the present disclosure. Distinction is not made between such categories as "workstation," "server," "laptop," "hand-held device," etc., as all are contemplated within the scope of FIG. 8 and reference to "computing device."

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 800. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 812 includes computer storage media in the form of volatile and/or nonvolatile memory. Memory 812 may be non-transitory memory. As depicted, memory 812 includes instructions 824. Instructions 824, when executed by processor(s) 814 are configured to cause the computing device to perform any of the operations described herein, in reference to the above-discussed figures, or to implement any program modules described herein. The memory may be removable, non-removable, or a combination thereof. Illustrative hardware devices include solid-state memory, hard drives, optical-disc drives, etc. Computing device 800 includes one or more processors that read data from various entities such as memory 812 or I/O components 820. Presentation component(s) 816 present data indications to a user or other device. Illustrative presentation components include a display device, speaker, printing component, vibrating component, etc.

I/O ports 818 allow computing device 800 to be logically coupled to other devices including I/O components 820, some of which may be built in. Illustrative components include a microphone, joystick, game pad, satellite dish, scanner, printer, wireless device, etc.

Embodiments presented herein have been described in relation to particular embodiments, which are intended in all respects to be illustrative rather than restrictive. Alternative embodiments will become apparent to those of ordinary skill in the art to which the present disclosure pertains without departing from its scope.

From the foregoing, it will be seen that this disclosure in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

In the preceding detailed description, reference is made to the accompanying drawings, which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in a limiting sense, and the scope of embodiments is defined by the appended claims and their equivalents.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:

1. One or more non-transitory computer-readable storage media having instructions stored thereon for generating a documentary of a source document, which, when executed by one or more processors of a computing device cause the computing device to perform actions comprising:
    accessing source content of the source document;
    determining a plurality of hierarchical structures of the source content and an arrangement order of the plurality of hierarchical structures of the source content;
    segmenting the source content into a plurality of hierarchical slices, wherein each of the plurality of hierarchical slices includes at least a rank that represents a depth level in the plurality of hierarchical structures and an index that represents an ordered position in the arrangement order of the plurality of hierarchical structures;
    generating a coding map that provides a map between the rank of each of the plurality of hierarchical slices, the index of each of the plurality of hierarchical slices, and a logical location of a portion of the source content corresponding to the hierarchical slice;
    generating, based on the map provided by the coding map, a target document that includes a presentation slide for each of the plurality of hierarchical slices, wherein a particular presentation slide for a particular hierarchical slice of the plurality of hierarchical slices is populated with the portion of the source content corresponding to the particular hierarchical slice from the generated mapping based on at least the rank and the index of the particular hierarchical slice.

2. The one or more computer-readable storage media of claim 1, wherein the actions further comprise:
    receiving one or more target document parameters;
    generating the coding map based on the one or more target document parameters; and
    populating each of the presentation slides based on the one or more target document parameters.

3. The one or more computer-readable storage media of claim 2, wherein the actions further comprise:
    determining a format of the target document based on the one or more target document parameters; and
    generating the target document in the determined format.

4. The one or more computer-readable storage media of claim 1, wherein the actions further comprise:
    generating source code based on the populated presentation slides; and
    generating a processor-executable application based on the source code.

5. The one or more computer-readable storage media of claim 1, wherein generating the target document includes generating a video presentation that includes the documentary of the source document.

6. The one or more computer-readable storage media of claim 1, wherein the actions further comprise:
    providing the target document to a user;
    receiving one or more edits from the user; and
    updating the target document based on the one or more edits.

7. The one or more computer-readable storage media of claim 1, wherein the actions further comprise:
    generating audible narration for textual content included in the source content; and
    updating at least one of the presentation slides that includes the textual content to automatically play the audible narration when the updated presentation slide is presented to a user.

8. A method for generating a documentary of a source document comprising:
    accessing source content of the source document; determining a plurality of hierarchical structures of the source content and an arrangement order of the plurality of hierarchical structures of the source content;
    segmenting the source content into a plurality of hierarchical slices, wherein each of the plurality of hierarchical slices includes at least a rank that represents a depth level in the plurality of hierarchical structures and an index that represents an ordered position in the arrangement order of the plurality of hierarchical structures;
    generating a coding map that provides a map between the rank of each of the plurality of hierarchical slices, the index of each of the plurality of hierarchical slices, and a logical location of a portion of the source content corresponding to the hierarchical slice;
    generating, based on the map provided by the coding map, a target document that includes a presentation slide for each of the plurality of hierarchical slices, wherein a particular presentation slide for a particular hierarchical slice of the plurality of hierarchical slices is populated with the portion of the source content corresponding to the particular hierarchical slice from the generated mapping based on at least the rank and the index of the particular hierarchical slice.

9. The method of claim 8, further comprising:
receiving one or more target document parameters;
generating the coding map based on the one or more target document parameters; and
populating each of the presentation slides based on the one or more target document parameters.

10. The method of claim 9, further comprising:
determining a format of the target document based on the one or more target document parameters; and
generating the target document in the determined format.

11. The method of claim 8, further comprising:
generating source code based on the populated presentation slides; and
generating a processor-executable application based on the source code.

12. The method of claim 8, wherein generating the target document includes generating a video presentation that includes the documentary of the source document.

13. The method of claim 8, further comprising:
providing the target document to a user;
receiving one or more edits from the user; and
updating the target document based on the one or more edits.

14. The method of claim 8, further comprising:
generating audible narration for at least a portion of textual content included in the source content; and
updating at least one of the one or more presentation slides that includes the portion of the textual content to include the audible narration.

15. A computing system for generating a documentary of a source document comprising: a processor; and a computer-readable storage medium, coupled with the processor, having instructions stored thereon, which, when executed by the processor, execute actions comprising:
accessing source content of the source document;
determining a plurality of hierarchical structures of the source content and an arrangement order of the plurality of hierarchical structures of the source content;
segmenting the source content into a plurality of hierarchical slices, wherein each of the plurality of hierarchical slices includes at least a rank that represents a depth level in the plurality of hierarchical structures and an index that represents an ordered position in the arrangement order of the plurality of hierarchical structures;
generating a coding map that provides a map between the rank of each of the plurality of hierarchical slices, the index of each of the plurality of hierarchical slices, and a logical location of a portion of the source content corresponding to the hierarchical slice;
generating, based on the map provided by the coding map, a target document that includes a presentation slide for each of the plurality of hierarchical slices, wherein a particular presentation slide for a particular hierarchical slice of the plurality of hierarchical slices is populated with the portion of the source content corresponding to the particular hierarchical slice from the generated mapping based on at least the rank and the index of the particular hierarchical slice.

16. The computing system of claim 15, wherein the actions further comprise:
receiving one or more target document parameters;
generating the coding map based on the one or more target document parameters; and
populating each of the presentation slides based on the one or more target document parameters.

17. The computing system of claim 16, wherein the actions further comprise:
determining a format of the target document based on the one or more target document parameters; and
generating the target document in the determined format.

18. The computing system of claim 15, wherein the actions further comprise:
generating source code based on the populated presentation slides; and
generating a processor-executable application based on the source code.

19. The computing system of claim 15, wherein the actions further comprise:
providing the target document to a user;
receiving one or more edits from the user; and
updating the target document based on the one or more edits.

20. The computing system of claim 15, wherein the actions further comprise:
generating audible narration for textual content included in the source content; and
updating at least one of the presentation slides that includes the textual content to automatically play the audible narration when the updated presentation slide is presented to a user.

* * * * *